US011653280B2

(12) United States Patent
Ohta et al.

(10) Patent No.: US 11,653,280 B2
(45) Date of Patent: May 16, 2023

(54) DEVICE-TO-DEVICE AND DEVICE TO NETWORK WIRELESS COMMUNICATION APPARATUS, WIRELESS COMMUNICATION SYSTEM, AND PROCESSING METHOD

(71) Applicant: FUJITSU LIMITED, Kawasaki (JP)

(72) Inventors: Yoshiaki Ohta, Yokohama (JP); Shinichiro Aikawa, Yokohama (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/025,479

(22) Filed: Jul. 2, 2018

(65) Prior Publication Data

US 2018/0310217 A1    Oct. 25, 2018

Related U.S. Application Data

(63) Continuation of application No. PCT/JP2016/050581, filed on Jan. 8, 2016.

(51) Int. Cl.
*H04W 36/30* (2009.01)
*H04W 28/02* (2009.01)
(Continued)

(52) U.S. Cl.
CPC ....... *H04W 36/30* (2013.01); *H04W 28/0252* (2013.01); *H04W 36/03* (2018.08); *H04W 40/34* (2013.01); *H04W 92/18* (2013.01)

(58) Field of Classification Search
CPC . H04W 36/30; H04W 36/03; H04W 28/0252; H04W 40/34; H04W 92/18; H04W 36/24; H04W 28/02; H04W 92/16
See application file for complete search history.

(56) References Cited

U.S. PATENT DOCUMENTS 7,831,252 B2 * 11/2010 Shang ................... H04W 76/23
                                                               370/332
2008/0311926 A1    12/2008 Fischer et al.
(Continued)

FOREIGN PATENT DOCUMENTS

JP       2005-151383 A    6/2005
JP       2010-529731 A    8/2010
(Continued)

OTHER PUBLICATIONS

Notice of Reasons for Refusal issued for corresponding Japanese Patent Application No. 2017-560027 dated Aug. 20, 2019; Full English translation attached.
(Continued)

*Primary Examiner* — Jenee Holland
(74) *Attorney, Agent, or Firm* — Myers Wolin, LLC

(57) ABSTRACT

A wireless apparatus, which is used as a first wireless apparatus in a wireless system that includes the first wireless apparatus and a plurality of second wireless apparatuses, includes: a communication circuit for receiving a result of measurement of a first channel from each of the plurality of second wireless apparatuses that communicate with each other via the first channel; and a control circuit for executing a first process when the result of the measurement is lower than a predetermined quality, wherein the first process causes the communication circuit to transmit a switching instruction to each of the plurality of second wireless apparatuses, to establish a second channel between the wireless apparatus and each of the plurality of second wireless apparatuses, and to switch wireless communication between each of the plurality of second wireless apparatuses via the first channel to wireless communication via the second channel.

15 Claims, 21 Drawing Sheets

(51) Int. Cl.
 *H04W 36/00* (2009.01)
 *H04W 40/34* (2009.01)
 *H04W 92/18* (2009.01)

(56) References Cited

U.S. PATENT DOCUMENTS

| | | | | |
|---|---|---|---|---|
| 2010/0009675 A1* | 1/2010 | Wijting | H04W 76/14 | 709/228 |
| 2010/0034163 A1 | 2/2010 | Damnjanovic et al. | | |
| 2010/0261469 A1* | 10/2010 | Ribeiro | H04W 99/00 | 455/67.11 |
| 2010/0279672 A1* | 11/2010 | Koskela | H04W 36/30 | 455/418 |
| 2011/0176450 A1* | 7/2011 | Kubota | H04W 72/0486 | 370/252 |
| 2011/0228666 A1* | 9/2011 | Barbieri | H04W 76/14 | 370/216 |
| 2012/0002643 A1* | 1/2012 | Chung | H04W 74/0833 | 370/331 |
| 2012/0163235 A1 | 6/2012 | Ho et al. | | |
| 2012/0208571 A1* | 8/2012 | Park | H04W 4/02 | 455/466 |
| 2013/0003541 A1 | 1/2013 | Zakrzewski | | |
| 2013/0064226 A1* | 3/2013 | Dinan | H04W 36/0085 | 370/332 |
| 2013/0156008 A1* | 6/2013 | Dinan | H04B 7/0456 | 370/332 |
| 2013/0195026 A1* | 8/2013 | Johnsson | H04W 76/28 | 370/329 |
| 2013/0223356 A1 | 8/2013 | Khoshnevis et al. | | |
| 2013/0242866 A1* | 9/2013 | Lin | H04W 76/14 | 370/328 |
| 2013/0244661 A1* | 9/2013 | Lin | H04W 76/14 | 455/436 |
| 2013/0322388 A1* | 12/2013 | Ahn | H04W 76/14 | 370/329 |
| 2013/0322413 A1* | 12/2013 | Pelletier | H04W 72/1289 | 370/336 |
| 2013/0336230 A1* | 12/2013 | Zou | H04W 76/14 | 370/329 |
| 2014/0071950 A1* | 3/2014 | Jang | H04W 36/0072 | 370/331 |
| 2014/0105178 A1* | 4/2014 | Jang | H04W 76/23 | 370/331 |
| 2014/0112194 A1* | 4/2014 | Novlan | H04W 48/16 | 370/254 |
| 2014/0122607 A1* | 5/2014 | Fodor | H04L 65/1069 | 709/204 |
| 2014/0135019 A1* | 5/2014 | Jang | H04W 36/0016 | 455/437 |
| 2014/0153390 A1* | 6/2014 | Ishii | H04W 28/0815 | 370/230 |
| 2014/0185587 A1* | 7/2014 | Jang | H04W 36/14 | 370/331 |
| 2014/0213221 A1* | 7/2014 | Chai | H04W 76/14 | 455/411 |
| 2014/0242963 A1* | 8/2014 | Novlan | H04W 48/16 | 455/418 |
| 2014/0243038 A1* | 8/2014 | Schmidt | H04W 76/14 | 455/552.1 |
| 2014/0243039 A1* | 8/2014 | Schmidt | H04W 72/048 | 455/552.1 |
| 2014/0243040 A1* | 8/2014 | Bienas | H04W 76/23 | 455/552.1 |
| 2014/0254523 A1* | 9/2014 | Chai | H04W 76/14 | 370/329 |
| 2014/0274066 A1* | 9/2014 | Fodor | H04W 36/0022 | 455/437 |
| 2014/0307611 A1 | 10/2014 | Tesanovic et al. | | |
| 2014/0314039 A1* | 10/2014 | Jang | H04W 76/14 | 370/329 |
| 2014/0321314 A1 | 10/2014 | Fodor et al. | | |
| 2014/0321452 A1* | 10/2014 | Choi | H04W 56/002 | 370/350 |
| 2014/0334446 A1 | 11/2014 | Lim et al. | | |
| 2014/0348079 A1* | 11/2014 | Turtinen | H04W 72/0406 | 370/329 |
| 2015/0094064 A1* | 4/2015 | Lei | H04W 36/03 | 455/436 |
| 2015/0124735 A1* | 5/2015 | Cho | H04W 72/042 | 370/329 |
| 2015/0126211 A1 | 5/2015 | Morita | | |
| 2015/0156693 A1* | 6/2015 | Tabet | H04W 36/30 | 455/437 |
| 2015/0163770 A1* | 6/2015 | Guo | H04W 72/04 | 455/450 |
| 2015/0181546 A1* | 6/2015 | Freda | H04L 5/0051 | 370/336 |
| 2015/0215981 A1* | 7/2015 | Patil | H04W 72/1263 | 370/329 |
| 2015/0222401 A1* | 8/2015 | Xu | H04L 41/0806 | 370/329 |
| 2015/0237555 A1* | 8/2015 | Kashiwase | H04W 36/03 | 370/329 |
| 2015/0245272 A1* | 8/2015 | Lindoff | H04W 36/30 | 370/332 |
| 2015/0245342 A1* | 8/2015 | Morita | H04W 76/14 | 455/552.1 |
| 2015/0271859 A1* | 9/2015 | Huang | H04W 24/10 | 370/329 |
| 2015/0271860 A1* | 9/2015 | Baghel | H04W 4/08 | 455/426.1 |
| 2015/0271861 A1* | 9/2015 | Li | H04W 76/14 | 455/426.1 |
| 2015/0282232 A1* | 10/2015 | Yamazaki | H04W 76/23 | 370/329 |
| 2015/0282234 A1* | 10/2015 | Sartori | H04W 72/042 | 370/329 |
| 2015/0289127 A1* | 10/2015 | Ou | H04W 8/005 | 455/426.1 |
| 2015/0304902 A1* | 10/2015 | Yu | H04W 36/03 | 455/436 |
| 2015/0327312 A1* | 11/2015 | Burbidge | H04W 72/14 | 370/329 |
| 2015/0327314 A1* | 11/2015 | Liu | H04W 72/0406 | 370/329 |
| 2016/0007336 A1 | 1/2016 | Fukuta et al. | | |
| 2016/0057795 A1 | 2/2016 | Kim et al. | | |
| 2016/0157292 A1 | 6/2016 | Fukuta et al. | | |
| 2016/0255638 A1* | 9/2016 | Martin | H04L 5/0053 | 370/329 |
| 2016/0270088 A1* | 9/2016 | Martin | H04W 76/14 | |
| 2016/0295621 A1 | 10/2016 | Han et al. | | |
| 2017/0019822 A1 | 1/2017 | Zhao et al. | | |
| 2017/0055240 A1* | 2/2017 | Kim | H04W 76/14 | |
| 2017/0064534 A1* | 3/2017 | Loehr | H04W 72/0413 | |
| 2017/0142692 A1* | 5/2017 | Kim | H04W 72/14 | |
| 2017/0150421 A1 | 5/2017 | Kuge et al. | | |
| 2017/0311309 A1* | 10/2017 | Fujishiro | H04W 72/048 | |

FOREIGN PATENT DOCUMENTS

| | | |
|---|---|---|
| JP | 2013-211858 A | 10/2013 |
| JP | 2014-504814 A | 2/2014 |
| JP | 2014-522601 A | 9/2014 |
| JP | 2014-522602 A | 9/2014 |
| JP | 2014-207669 A | 10/2014 |
| JP | 2014-532372 A | 12/2014 |
| JP | 2015-012344 A | 1/2015 |
| JP | 2015-508598 A | 3/2015 |
| JP | 2015-508943 A | 3/2015 |
| JP | 2015-536620 A | 12/2015 |
| JP | 5852261 B2 | 2/2016 |
| WO | 2013/183732 A1 | 12/2013 |
| WO | 2014/065167 A1 | 5/2014 |

(56) References Cited

FOREIGN PATENT DOCUMENTS

| WO | 2014/129452 A | 8/2014 |
|----|---------------|--------|
| WO | 2015/139609 A1 | 9/2015 |

OTHER PUBLICATIONS

Notification of Reasons for Refusal issued by the Japan Patent Office for corresponding Japanese Patent Application No. 2017-560027, dated Feb. 5, 2019, with an English translation.
Non-final Office Action issued by the USPTO for co-pending U.S. Appl. No. 16/025,475 dated Sep. 6, 2019.
International Search Report with Written Opinion of the International Searching Authority issued by the Japan Patent Office for corresponding International Patent Application No. PCT/JP2016/050569, dated Mar. 8, 2016, with a partial English translation.
Notification of Reasons for Refusal issued by the Japan Patent Office for corresponding Japanese Patent Application No. 2017-560019, dated Feb. 5, 2019, with an English translation.
Notification of Reasons for Refusal issued by the Japan Patent Office for corresponding Japanese Patent Application No. 2017-560019, dated Apr. 2, 2019, with an English translation.
International Search Report with Written Opinion of the International Searching Authority issued by the Japan Patent Office for corresponding International Patent Application No. PCT/JP2016/050581, dated Mar. 8, 2016, with a partial English translation.
3GPP TS 36.300 V12.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2015.
3GPP TS 36.211 V12.5.0, "3rd Generation Partnership Project; Technical Specification Group Radio Access Network; Evolved Universal Terrestrial Radio Access (E-UTRA); Physical channels and modulation (Release 12)", Mar. 2015.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)", Mar. 2015.
3GPP TS 36.213 V12.5.0, "3rd Generation Partnership Project; Technical Specification Group Radio Access Network; Evolved Universal Terrestrial Radio Access (E-UTRA); Physical layer procedures (Release 12)", Mar. 2015.
3GPP TS 36.321 V12.5.0, "3rd Generation Partnership Project; Technical Specification Group Radio Access Network; Evolved Universal Terrestrial Radio Access (E-UTRA); Medium Access Control (MAC) protocol specification (Release 12)", Mar. 2015.
3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)", Mar. 2015.
3GPP TS 36.323 V12.3.0, "3rd Generation Partnership Project; Technical Specification Group Radio Access Network; Evolved Universal Terrestrial Radio Access (E-UTRA); Packet Data Convergence Protocol (PDCP) specification Release 12)", Mar. 2015.
3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)", Mar. 2015.
3GPP TS 36.413 V12.5.0, "3rd Generation Partnership Project; Technical Specification Group Radio Access Network; Evolved Universal Terrestrial Radio Access Network (E-UTRAN); S1 Application Protocol (S1AP) (Release 12)", Mar. 2015.
3GPP TS 36.423 V12.5.0, "3rd Generation Partnership Project; Technical Specification Group Radio Access Network; Evolved Universal Terrestrial Radio Access Network (E-UTRAN); X2 application protocol (X2AP) (Release 12)", Mar. 2015.
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.
Non-Final Office Action issued by the United States Patent and Trademark Office for corresponding U.S. Appl. No. 16/025,475, electronically delivered dated Mar. 20, 2020.
Notice of Reasons for Refusal issued by the Japan Patent Office for corresponding Japanese Patent Application No. 2019-192332, dated Oct. 13, 2020, with a full English machine translation.
Non-Final Office Action issued by the United States Patent and Trademark Office for corresponding U.S. Appl. No. 16/025,475, dated Jun. 24, 2021.
Final Office Action issued by the United States Patent and Trademark office for corresponding U.S. Appl. No. 16/025,475, electronically delivered dated Feb. 3, 2022.
Non-Final Office Action issued by the United States Patent and Trademark Office for corresponding U.S. Appl. No. 16/025,475, electronically delivered dated Sep. 2, 2022.
Final Office Action issued by the United States Patent and Trademark Office for corresponding U.S. Appl. No. 16/025,475, electronically delivered dated Oct. 1, 2020.
Decision of Dismissal of Amendment issued by the Japan Patent Office for corresponding Japanese Patent Application No. 2017-560027, dated Mar. 24, 2020, with an English machine translation.
Final Office Action issued by the United States Patent and Trademark Office for corresponding U.S. Appl. No. 16/025,475, dated Mar. 16, 2023.

* cited by examiner

DEVICE-TO-DEVICE AND DEVICE TO NETWORK WIRELESS COMMUNICATION APPARATUS, WIRELESS COMMUNICATION SYSTEM, AND PROCESSING METHOD

CROSS-REFERENCE TO RELATED APPLICATION

This application is a continuation application of International Patent Application PCT/JP2016/050581 filed on Jan. 8, 2016 and designated the U.S., the entire contents of which are incorporated herein by reference.

FIELD

The embodiments discussed herein are related to a wireless communication apparatus, a wireless communication system, and a processing method.

BACKGROUND

In recent years, a discussion on next generation wireless communication technologies has been made to achieve higher-speed and higher-capacity wireless communication, and the like in a wireless communication system such as a cellular system that is one of the portable telephone systems. For example, in the 3rd Generation Partnership Project (3GPP) that is a collaboration for standards, a discussion has been made on a communication standard called "LTE-Advanced (LTE-A)."

There is a direct communication between user terminals called "Device-to-Device (D2D) communication" that has the likelihood of being introduced in LTE-A in future and that is one of the communication technologies on which a basic technical discussion has been made in 3GPP. In a cellular communication in the related art, although user terminals are present close to each other, communication is performed with a base station being involved. In contrast, in the D2D communication, the user terminals that are present close to each other perform direct communication without the base station being involved.

Furthermore, a discussion has been made on the introduction of a terminal that possibly performs both the cellular communication and the D2D communication. In a case where, in such a terminal, the cellular communication is performed with the base station being involved, if the D2D communication is possible between the terminal and a terminal that is a communication partner, setting of a communication channel for performing the D2D communication and the D2D communication is performed via the communication channel that is set. Furthermore, in the terminal that possibly performs both the cellular communication and the D2D communication, while the D2D communication is in progress, in a case where a quality of the communication channel that is used for the D2D communication is degraded, switching is caused to occur from the D2D communication to the cellular communication with the base station being involved.

Examples of the related art include Japanese National Publication No. 2014-504814 and International Publication Pamphlet No. 2014/065167.

Example of the related art include Non-Patent Literature 1 [3GPP TS 36.300 V12.5.0 (2015 March), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2], Non-Patent Literature 2 [3GPP TS 36.211 V12.5.0 (2015 March), 3rd Generation Partnership Project; Technical Specification Group Radio Access Network; Evolved Universal Terrestrial Radio Access (E-UTRA); Physical channels and modulation], Non-Patent Literature 3 [3GPP TS 36.212 V12.4.0 (2015 March), 3rd Generation Partnership Project; Technical Specification Group Radio Access Network; Evolved Universal Terrestrial Radio Access (E-UTRA); Multiplexing and channel coding], Non-Patent Literature 4 [3GPP TS 36.213 V12.5.0 (2015 March), 3rd Generation Partnership Project; Technical Specification Group Radio Access Network; Evolved Universal Terrestrial Radio Access (E-UTRA); Physical layer procedures], Non-Patent Literature 5 [3GPP TS 36.321 V12.5.0 (2015 March), 3rd Generation Partnership Project; Technical Specification Group Radio Access Network; Evolved Universal Terrestrial Radio Access (E-UTRA); Medium Access Control (MAC) protocol specification], Non-Patent Literature 6 [3GPP TS 36.322 V12.2.0 (2015 March), 3rd Generation Partnership Project; Technical Specification Group Radio Access Network; Evolved Universal Terrestrial Radio Access (E-UTRA); Radio Link Control (RLC) protocol specification], Non-Patent Literature 7 [3GPP TS 36.323 V12.3.0 (2015 March), 3rd Generation Partnership Project; Technical Specification Group Radio Access Network; Evolved Universal Terrestrial Radio Access (E-UTRA); Packet Data Convergence Protocol (PDCP) specification], Non-Patent Literature 8 [3GPP TS 36.331 V12.5.0 (2015 March), 3rd Generation Partnership Project; Technical Specification Group Radio Access Network; Evolved Universal Terrestrial Radio Access (E-UTRA); Radio Resource Control (RRC); Protocol specification], Non-Patent Literature 9 [3GPP TS 36.413 V12.5.0 (2015 March), 3rd Generation Partnership Project; Technical Specification Group Radio Access Network; Evolved Universal Terrestrial Radio Access Network (E-UTRAN); S1 Application Protocol (S1AP)], Non-Patent Literature 10 [3GPP TS 36.423 V12.5.0 (2015 March), 3rd Generation Partnership Project; Technical Specification Group Radio Access Network; Evolved Universal Terrestrial Radio Access Network (E-UTRAN); X2 Application Protocol (X2AP)], and Non-Patent Literature 11 [3GPP TR 36.842 V12.0.0 (2013 December), 3rd Generation Partnership Project; Technical Specification Group Radio Access Network; Study on Small Cell enhancements for E-UTRA and E-UTRAN; Higher layer aspects].

SUMMARY

According to an aspect of the invention, provided is a wireless communication apparatus that is used as a second wireless communication apparatus in a wireless communication system that includes a first wireless communication apparatus and a plurality of the second wireless communication apparatuses. The wireless communication apparatus includes: a communication circuit configured to perform wireless communication via a first communication channel between the wireless communication apparatus and one other second wireless communication apparatus, and wireless communication via a second communication channel between the wireless communication apparatus and the first wireless communication apparatus; and a control circuit configured to control the communication circuit to establish the second communication channel between the wireless communication apparatus and the first wireless communication apparatus and switch from wireless communication with the one other second wireless communication apparatus via the first communication channel to wireless communication via the second communication channel, in a case where a quality of the first communication channel is poorer than a prescribed quality, or in a case where a switching instruction that is a signal at Layer 2 or Layer 3 is received from the one other second wireless communication apparatus or the first wireless communication apparatus, during wireless communication with the one other second wireless communication apparatus via the first communication channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the present circumstance, standards for switching between cellular communication and D2D communication are not established. For this reason, specific control in a case where inter-terminal communication switching is caused to occur between the cellular communication and the D2D communication is not disclosed.

An object of the technology disclosed in the present application is to provide a wireless communication apparatus, a wireless communication system, and a processing method that are capable of realizing switching between a communication channel that is used for cellular communication or the like and a communication channel that is used for D2D communication or the like.

Wireless communication apparatuses, wireless communication systems, and processing methods according to embodiments that are disclosed in the present application will be described below with reference to the drawings. It is noted that embodiments which will be described are not limited to the technology that is disclosed. Furthermore, it does without saying that the embodiments which will be described below may be suitably combined for implementation.

First Embodiment

Configuration of a Wireless Communication System 10

Figure 1:
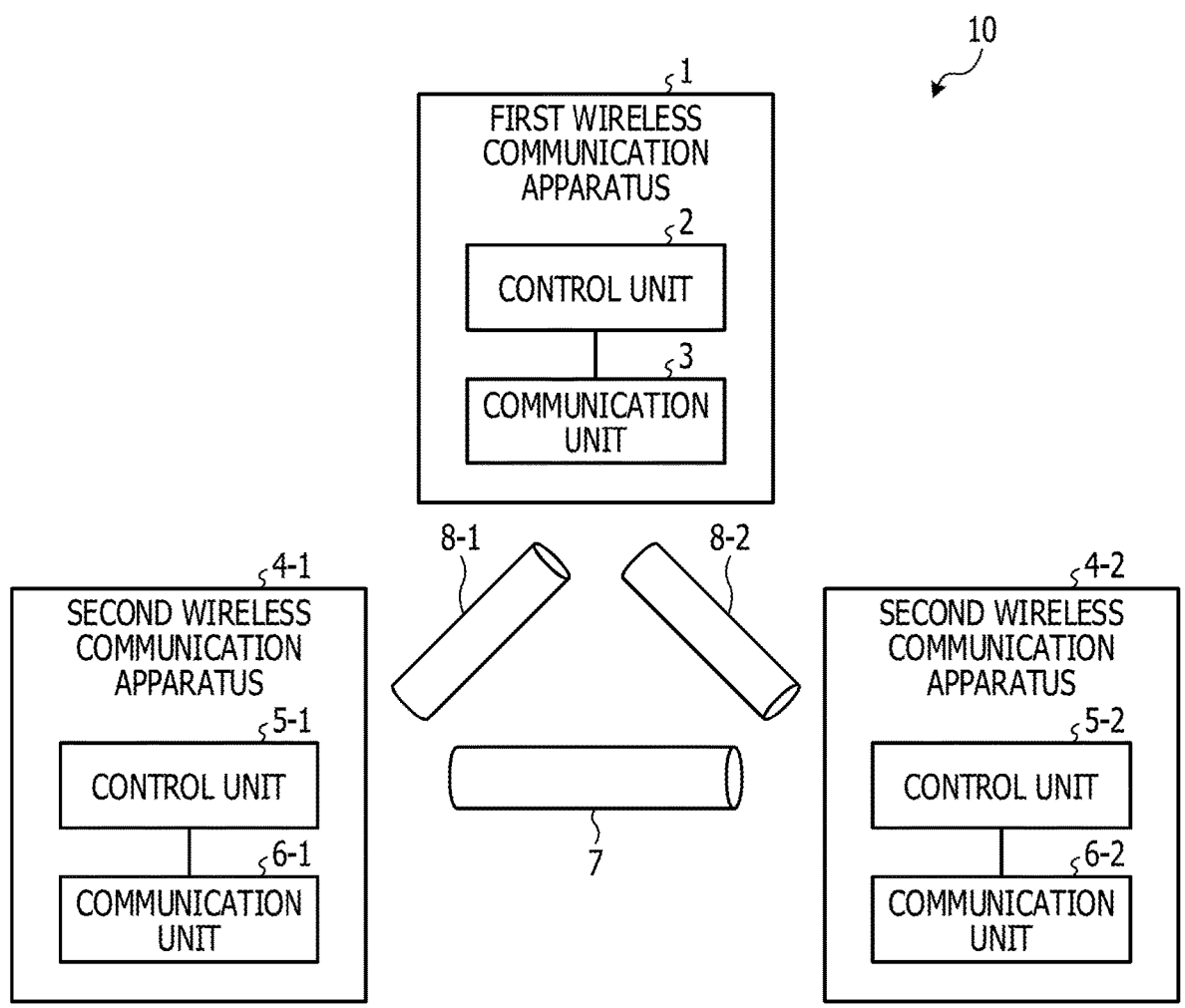
FIG. 1 is a diagram illustrating an example of a wireless communication system according to a first embodiment.

FIG. 1 is a diagram illustrating an example of a wireless communication system 10 according to a first embodiment. The wireless communication system 10 according to the first embodiment includes a first wireless communication apparatus 1, a second wireless communication apparatus 4-1, and a second wireless communication apparatus 4-2. The first wireless communication apparatus 1 has a control unit 2 and a communication unit 3. The second wireless communication apparatus 4-1 has a control unit 5-1 and a communication unit 6-1. The second wireless communication apparatus 4-2 has a control unit 5-2 and a communication unit 6-2. The second wireless communication apparatus 4-1 and the second wireless communication apparatus 4-2 possibly performs wireless communication via a first communication channel 7. Furthermore, the second wireless communication apparatus 4-1 possibly performs wireless communication with the first wireless communication apparatus 1 via a second communication channel 8-1 between the second wireless communication apparatus 4-1 itself and the first wireless communication apparatus 1, and the second wireless communication apparatus 4-2 possibly performs wireless communication with the first wireless communication apparatus 1 via a second communication channel 8-2 between the second wireless communication apparatus 4-2 itself and the first wireless communication apparatus 1. The first communication channel 7 is used, for example, for the D2D communication, and the second communication channels 8-1 and 8-2 are used, for example for the cellular communication.

It is noted that, in a case where the second wireless communication apparatus 4-1 and the second wireless communication apparatus 4-2 are collectively referred to without being distinguished from each other, the second wireless communication apparatus 4-1 and the second wireless communication apparatus 4-2 will be collectively described below as the second wireless communication apparatus 4. Furthermore, in a case where the control unit 5-1 and the control unit 5-2 are collectively referred to without being distinguished from each other, the control unit 5-1 and the control unit 5-2 will be described below as the control unit 5. In a case where the communication unit 6-1 and the communication unit 6-2 are collectively referred to without being distinguished from each other, the communication unit 6-1 and the communication unit 6-2 will be collectively described below as the communication unit 6. Furthermore, in a case where the second communication channel 8-1 and the second communication channel 8-2 are collectively referred to without being distinguished from each other, the second communication channel 8-1 and the second communication channel 8-2 will be collectively described below as the second communication channel 8.

The communication unit 6 of each second wireless communication apparatus 4 possibly performs wireless communication via the first communication channel 7 between the second wireless communication apparatus 4 itself and one other second wireless communication apparatus 4, and possibly performs wireless communication via the second communication channel 8 between the second wireless communication apparatus 4 itself and the first wireless communication apparatus 1. In a case where, in wireless communication with one other second wireless communication apparatus 4 via the first communication channel 7, a quality of the first communication channel 7 is poorer than a predetermined quality, or in a case where a switching instruction is received from the one other second wireless communication apparatus 4 or the first wireless communication apparatus 1, the control unit 5 of each second wireless communication apparatus 4 controls the communication unit 6 and thus establishes the second communication channel 8. The switching instruction, for example, is a signal at Layer 2 or Layer 3 of Open Systems Interconnection (OSI) Reference Model. Then, the control unit 5 performs control that causes switching to occur from the wireless communication with one other second wireless communication apparatus 4 via the first communication channel 7 to the wireless communication via the second communication channel 8. Accordingly, each second wireless communication apparatus 4 can realize switching between the first communication channel 7 that is used for the D2D communication or the like and the second communication channel 8 that is used for the cellular communication or the like.

At this point, several detailed examples of control that is performed by the control unit 5 of each second wireless communication apparatus 4 will be given below. As an example, in a case where, in a wireless communication with one other second wireless communication apparatus 4 via the first communication channel 7, a state where the quality of the first communication channel 7 is poorer than the predetermined quality continues for a predetermined time or longer, the control unit 5 controls the communication unit 6 and thus establishes the second communication channel 8 between the second wireless communication apparatus itself and the first wireless communication apparatus 1. Then, the control unit 5 controls the communication unit 6 and thus causes the switching to occur from the communication with one other second wireless communication apparatus 4 via the first communication channel 7 to the wireless communication via the second communication channel 8. Accordingly, the second wireless communication apparatus 4 can suppress occurrence of interruption of communication with one other second wireless communication apparatus 4.

Furthermore, as the second example, in a case where, in the wireless communication with the one other second wireless communication apparatus 4 via the first communication channel 7, the quality of the first communication channel 7 is poorer than the predetermined quality, the control unit 5 controls the communication unit 6 and thus transmits the switching instruction to one other the second wireless communication apparatus 4 via the first communication channel 7. Then, in a case where a response to the switching instruction is received, the control unit 5 controls the communication unit 6, and thus establishes the second communication channel 8 between the second wireless communication apparatus 4 itself and the first wireless communication apparatus 1 and causes the switching to occur from the communication with one other second wireless communication apparatus 4 via the first communication channel 7 to the wireless communication via the second communication channel 8. Accordingly, a plurality of second wireless communication apparatuses 4 can synchronize communication channels that are used for communication, to each other, and can switch between the communication channels. Accordingly, the time for which transmission data stays within each second wireless communication apparatus 4 can be shortened, and a size of a transmission buffer that is provided within each second wireless communication apparatus 4 can be decreased.

It is noted that, in the second example, even in a case where the response to the transmitted switching instruction is not received, if the state where the quality of the first communication channel 7 is poorer than the predetermined quality continues for the predetermined time or longer, the control unit 5 controls the communication unit 6, and thus establishes the second communication channel 8 between the second wireless communication apparatus 4 itself and the first wireless communication apparatus 1. Then, the control unit 5 controls the communication unit 6 and thus causes the switching to occur from the communication with one other second wireless communication apparatus 4 via the first communication channel 7 to the wireless communication via the second communication channel 8. Accordingly, the second wireless communication apparatus 4 can suppress more reliably the occurrence of the interruption of the communication with one other second wireless communication apparatus 4.

Furthermore, as the third example, in a case where, in the wireless communication with one other second wireless communication apparatus 4 via the first communication channel 7, the quality of the first communication channel 7 is poorer than the predetermined quality, the control unit 5 controls the communication unit 6 and thus transmits a result of determination of the quality of the first communication channel 7 to the first wireless communication apparatus 1. The communication unit 3 of the first wireless communication apparatus 1 receives the result of the determination that is transmitted from the second wireless communication apparatus 4. In a case where the quality of the first communication channel 7 that is indicated by the result of the determination is poorer than the predetermined quality, the control unit 2 of the first wireless communication apparatus 1 controls the communication units 3, and thus transmits the switching instruction that is a signal at Layer 2 or Layer 3, to each of the plurality of second wireless communication apparatuses, for example, to the second wireless communication apparatuses 4-1 and 4-2. Then, the control unit 2 controls the communication unit 3, and thus performs control that establishes the second communication channel 8 between each of the plurality of second wireless communication apparatuses, for example, between the second wireless communication apparatuses 4-1 and 4-2.

In a case where the switching instruction is received from the first wireless communication apparatus 1, the control unit 5 of the second wireless communication apparatus 4 controls the communication unit 6, and thus the second communication channel 8 between the second wireless communication apparatus 4 itself and the first wireless communication apparatus 1. Then, the control unit 5 controls the communication unit 6 and thus causes the switching to occur from the communication with one other second wireless communication apparatus 4 via the first communication channel 7 to the wireless communication via the second communication channel 8. The switching is caused to occur between the communication channels that are used by the second wireless communication apparatuses 4 for communication, according to the switching instructions that are received from the first wireless communication apparatus 1, and thus the suppression of the occurrence of the interruption of the communication between the second wireless communication apparatuses 4 can be realized with high reliability.

It is noted that, in the third example, even in a case where the switching instruction is not received from the first wireless communication apparatus 1, if the state where the quality of the first communication channel 7 is poorer than the predetermined quality continues for the predetermined time or longer, the control unit 5 may control the communication unit 6 and thus may establish the second communication channel 8 between the second wireless communication apparatus 4 itself and the first wireless communication apparatus 1. Then, the control unit 5 controls the communication unit 6 and thus causes the switching to occur from the wireless communication with the second wireless communication apparatus 4 via the first communication channel 7 to the wireless communication via the second communication channel 8. Accordingly, the second wireless communication apparatus 4 can suppress more reliably the occurrence of the interruption of the communication with one other second wireless communication apparatus 4.

Second Embodiment

Configuration of the Wireless Communication System 10

Figure 2:
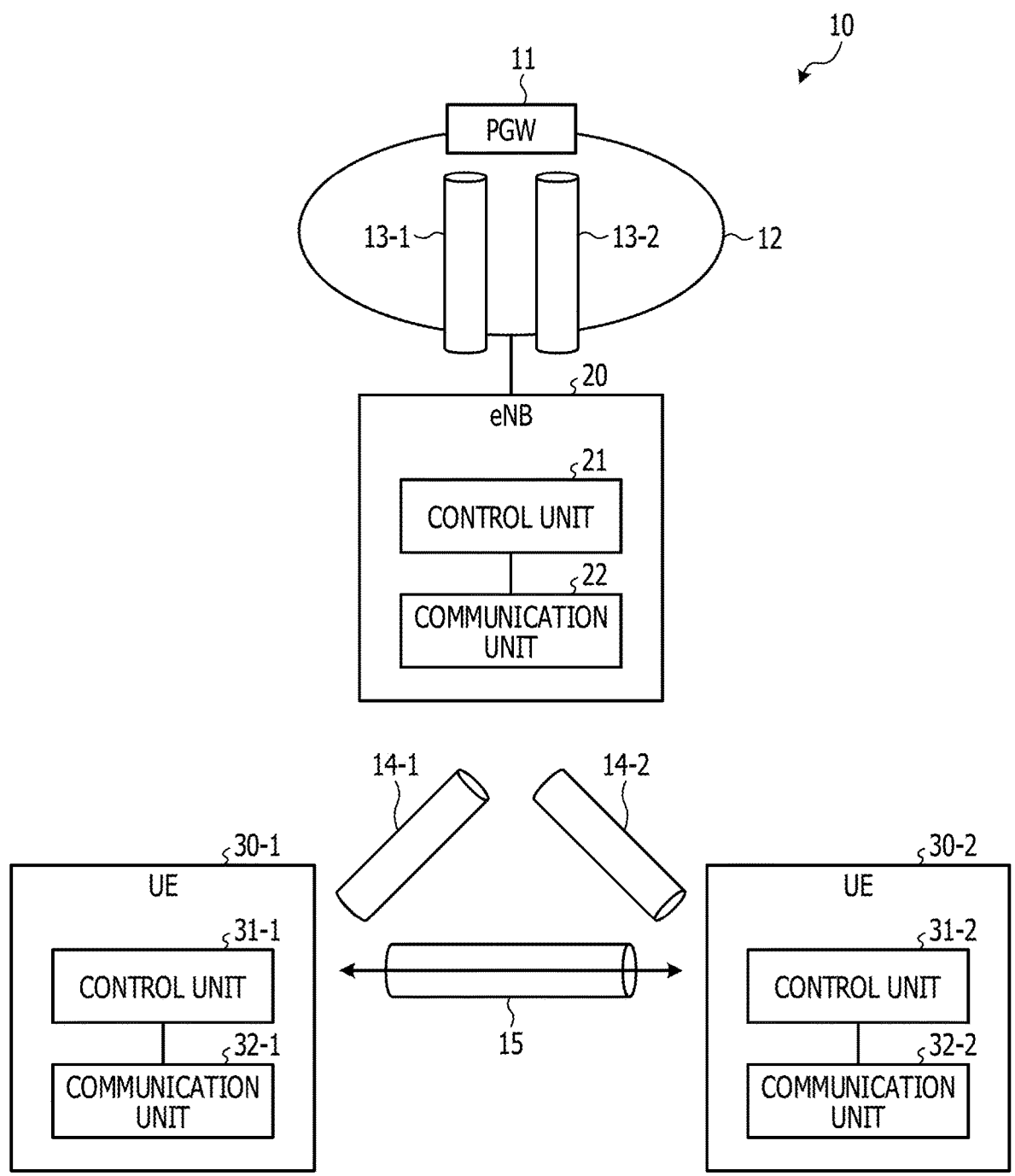
FIG. 2 is a diagram illustrating an example of a wireless communication system according to a second embodiment.

FIG. 2 is a diagram illustrating an example of a wireless communication system 10 according to a second embodiment. The second embodiment is equivalent to an embodiment that is more specific in concept than the first embodiment. The wireless communication system 10 according to the second embodiment includes an evolved Node B (eNB) 20, user equipment (UE) 30-1, and UE 30-2. The UE 30-1 has a control unit 31-1 and a communication unit 32-1. The UE 30-2 has a control unit 31-2 and a communication unit 32-2. The UE 30-1 and the UE 30-2 possibly perform the D2D communication via the communication channel 15. The communication channel 15 is also referred to as a sidelink radio bearer (SLRB). Furthermore, the UE 30-1 possibly performs the cellular communication with the eNB 20 via a communication channel 14-1 between the UE 30-1 itself and the eNB 20, and the UE 30-2 possibly performs the cellular communication with eNB 20 via a communication channel 14-2 between the UE 30-2 itself and the eNB 20.

It is noted that, in a case where the UE 30-1 and the UE 30-2 are collectively referred to without being distinguished from each other, the UE 30-1 and the UE 30-2 will be collectively described below as the UE 30. Furthermore, in a case where the control unit 31-1 and the control unit 31-2 are collectively referred to without being distinguished from each other, the control unit 31-1 and the control unit 31-2 will be collectively described below as the control unit 31, and, in a case where the communication unit 32-1 and the communication unit 32-2 are collectively referred to without being distinguished from each other, the communication unit 32-1 and the communication unit 32-2 will be collectively described below as the communication unit 32. Furthermore, in a case where the communication channel 14-1 and the communication channel 14-2 are collectively described referred to without being distinguished from each other, the communication channel 14-1 and the communication channel 14-2 will be collectively described below as the communication channel 14. The eNB 20 is an example of a base station, and the UE 30 is an example of a terminal or a mobile station. Furthermore, the eNB 20 is an example of the first wireless communication apparatus 1 according to the first embodiment, and the UE 30 is an example of the second wireless communication apparatus 4 according to the first embodiment. Furthermore, the communication channel 15 is an example of the first communication channel 7 according to the first embodiment, and each communication channel 14 is an example of the second communication channel 8.

The eNB 20 is connected, for example, to a core network 12 such as an evolved packet core (EPC). For initial access from the UE 30, the eNB 20 establishes the communication channel 14 between the eNB 20 itself and the UE 30 and establishes a communication channel 13 between the eNB 20 itself and a packet data network gateway (PGW) 11 on the core network 12. The communication channel 13 and the communication channel 14 is also referred to, for example, as an evolved packet system (EPS). A default bearer is included in, and an individual bearer, as occasion demands, is added to the communication channel 13 and the communication channel 14. Furthermore, the communication channel 14 is also referred to as a wireless bearer. Furthermore, the communication channel 13, the communication channel 14, and the communication channel 15 may be referred to as calls.

In an example in FIG. 2, a communication channel 13-1 and the communication channel 14-1 are established between the UE 30-1 and the PGW 11, and a communication channel 13-2 and the communication channel 14-2 are established between the UE 30-2 and the PGW 11. Accordingly, the UE 30 proceeds to an RRC connection mode. It is noted that, in a case where the communication channel 13-1 and the communication channel 13-2 are collectively referred to without being distinguished from each other, the communication channel 13-1 and the communication channel 13-2 will be collectively described below as the communication channel 13.

In a case where one other piece of UE 30 that is a communication partner is detected, the control unit 31 of the UE 30 controls the communication unit 32 and thus establishes the communication channel 15 between the UE 30 itself and the one other piece of UE 30. The control unit 31 establishes the communication channel 15, for example, using a resource that is allocated from the eNB 20. Then, the control unit 31 of the UE 30 controls the communication unit 32 and thus performs the D2D communication with the one other piece of UE 30 via the established communication channel 15.

Figure 3:
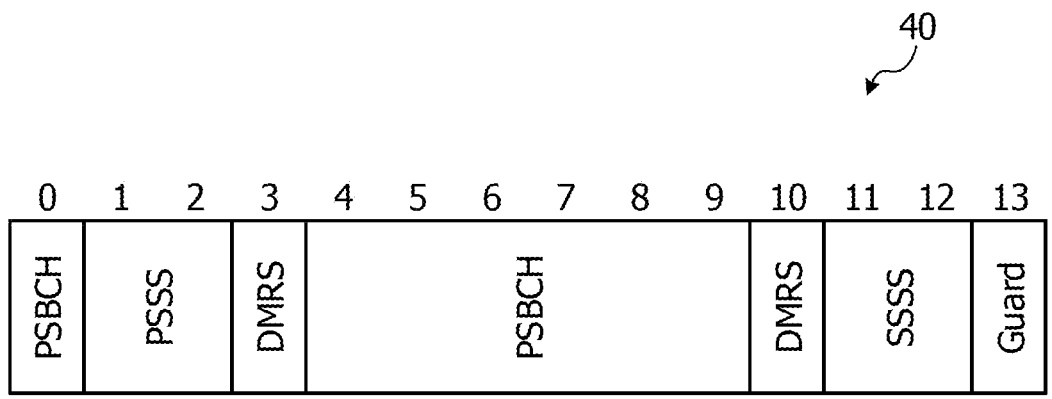
FIG. 3 is a diagram illustrating an example of a format of a synchronization frame that is transmitted and received during D2D communication.

In the D2D communication via the communication channel 15, the UE 30 transmits, for example, a synchronization frame in a format that is illustrated in FIG. 3, with a predetermined periodicity. FIG. 3 is a diagram illustrating an example of a format of a synchronization frame 40 that is transmitted and received during the D2D communication. PSBCH, PSSS, DMRS, SSSS, and a guard are included in the synchronization frame 40. The PSBCH is an acronym for Physical Sidelink Broadcast Channel, and the PSSS is an acronym for Primary Sidelink Synchronization Signal. Furthermore, the DMRS is an acronym for Demodulation Reference Signal, and the SSSS is an acronym for Secondary Sidelink Synchronization Signal.

The control unit 31 of the UE 30 measures a quality of the communication channel 15. The control unit 31, for example, measures reception qualities of the PSSS and the SSSS that are included in the synchronization frame 40, as the quality of the communication channel 15. For example, based on error rates of the PSSS and the SSSS, or the like, the control unit 31 measures a reception quality of the synchronization frame 40. In a case where the quality of the communication channel 15 is poorer than a predetermined quality, the control unit 31 causes a timer to be reset for restarting. In the present embodiment, the time that is measured by the timer is the time that is equal to or smaller than the processing time that is allowed for processing for a handover, and for example, is the time in a range for several tens milliseconds to 200 milliseconds. Before the timer expires, in a case where the quality of the communication channel 15 is better than a predetermined quality, the control unit 31 causes the timer to stop. In a case where the timer expires while a state is maintained where the quality of the communication channel 15 is poorer than the predetermined quality, the control unit 31 controls the communication unit 32 and thus transmits a communication channel establishment request to the eNB 20 and establishes the communication channel 14 between the UE 30 itself and the eNB 20. In the present embodiment, the communication channel establishment request is a signal at Layer 2 or Layer 3 of the OSI reference model. The default bearer is included in, and the individual bearer, as occasion demands, is added to the communication channel 14 that is established by the control unit 31 between the UE 30 itself and the eNB 20. Furthermore, when the communication channel 14 is established between the UE 30 itself and the eNB 20, the control unit 31 performs processing such as semi-persistent scheduling (SPS) activation.

Figure 4:
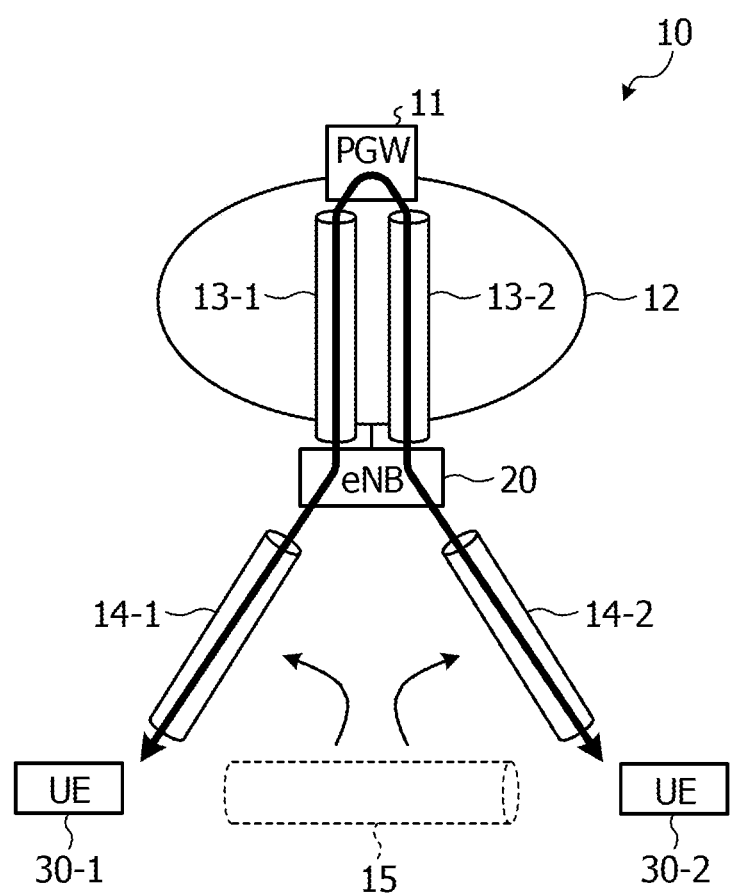
FIG. 4 is a diagram illustrating an example of a flow of data after switching.

Then, the control unit 31 controls the communication unit 32 and thus causes switching to occur from wireless communication with one other piece of UE 30 via the communication channel 15 to wireless communication via the communication channel 14 that is established between the UE 30 itself and the eNB 20. Accordingly, wireless communication between the UE 30-1 and the UE 30-2, for example, as illustrated in FIG. 4, switches from the wireless communication via the communication channel 15 to the wireless communication via the communication channel 13 and the communication channel 14. FIG. 4 is a diagram illustrating an example of a flow of data after the switching.

Operation of the Wireless Communication System 10

Figure 5:
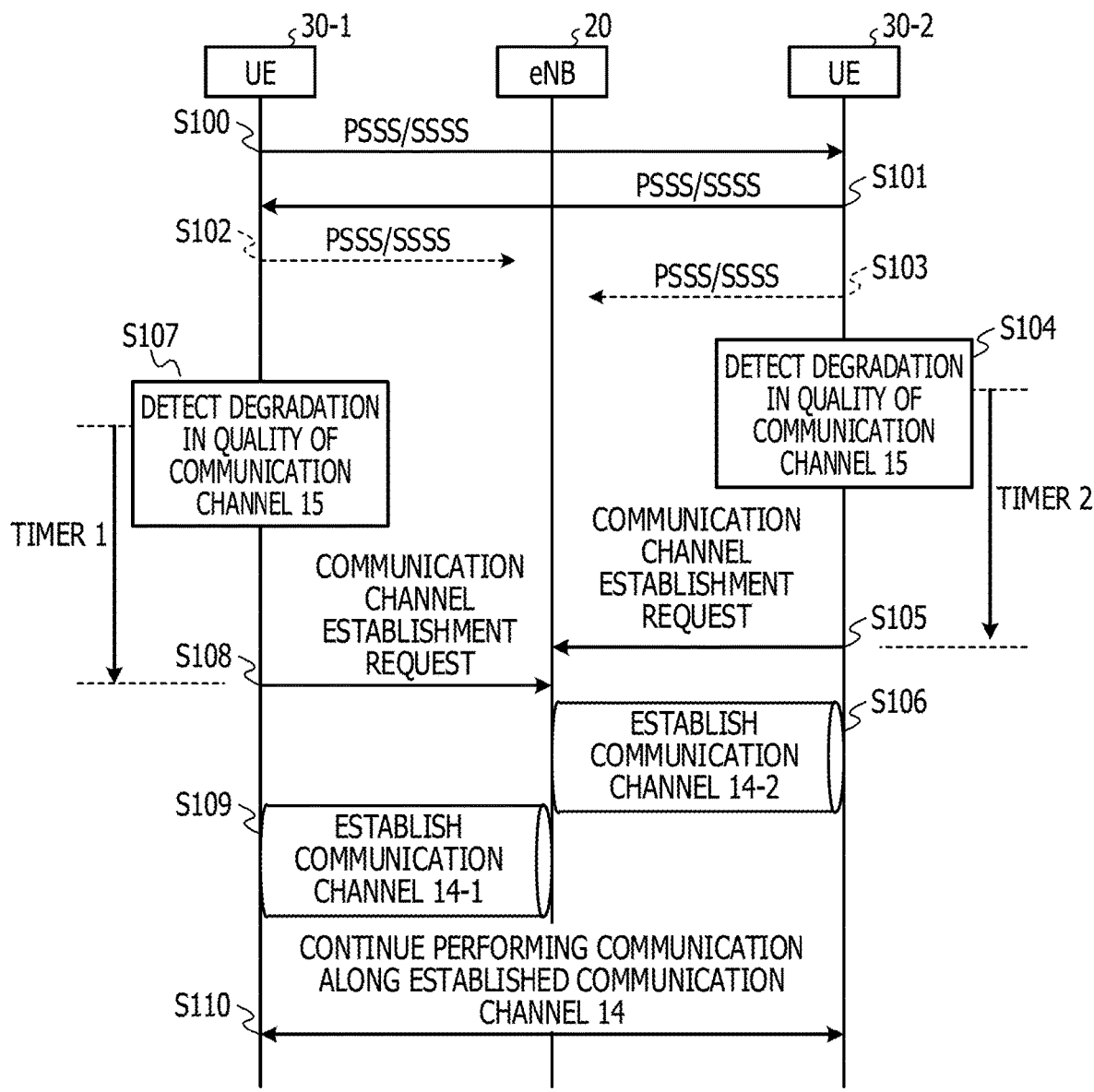
FIG. 5 is a sequence diagram illustrating an example of operation of the wireless communication system according to the second embodiment.

FIG. 5 is a sequence diagram illustrating an example of operation of the wireless communication system 10 according to the second embodiment. It is noted that, before a sequence that is illustrated in FIG. 5, each of the UE 30-1 and the UE 30-2 performs the initial access between each of the UE 30-1 and the UE 30-2 themselves and the eNB 20, and proceeds to a connection mode. Furthermore, before the sequence that is illustrated in FIG. 5, the UE 30-1 and the UE 30-2 establish the communication channel 15 and perform the D2D communication via the communication channel 15.

First, the UE 30-1 and the UE 30-2 periodically transmit the synchronization frame 40 including the PSSS and the SSSS, via the communication channel 15 (S100 and S101). The UE 30-2 measures the quality of the communication channel 15 based on the reception quality of the synchronization frame 40 that is transmitted from the UE 30-1, and determines whether or not the measured quality of the communication channel 15 is poorer than the predetermined quality.

In a case where the quality of the communication channel 15 is poorer than the predetermined quality (S102), the UE 30-2 detects a degradation in the quality of the communication channel 15 (S104). In a case where the degradation in the quality of the communication channel 15 is detected, the UE 30-2 causes a timer 2 that measures a predetermined time, to be reset for restarting. Then, in a case where the timer 2 expires, the UE 30-2 transmits the communication channel establishment request to the eNB 20 (S105). Then, the UE 30-2 establishes the communication channel 14-2 between the UE 30-2 itself and the eNB 20 (S106).

In the same manner, the UE 30-1 measures the quality of the communication channel 15 based on the reception quality of the synchronization frame 40 that is transmitted from the UE 30-2, and determines whether or not the measured quality of the communication channel 15 is poorer than the predetermined quality. In the case where the quality of the communication channel 15 is poorer than the predetermined quality (S103), the UE 30-1 detects the degradation in the quality of the communication channel 15 (S107).

In the case where the degradation in the quality of the communication channel 15 is detected, the UE 30-1 causes a timer 1 that measures a predetermined time, to be reset for restarting. Then, in a case where the timer 1 expires, the UE 30-1 transmits the communication channel establishment request to the eNB 20 (S108). Then, the UE 30-1 establishes the communication channel 14-1 between the UE 30-1 itself and the eNB 20 (8109). Then, each of the UE 30-1 and the UE 30-2 causes switching to occur from communication via the communication channel 15 to communication via the communication channel 14 that is established between each of the UE 30-1 and the UE 30-2 themselves and the eNB 20, and continues performing the communication (8110).

In this manner, in a case where, during wireless communication with one other piece of UE 30 via the communication channel 15, a state where the quality of the communication channel 15 is poorer than the predetermined quality continues for a predetermined time or longer, the UE 30 according to the present embodiment establishes the communication channel 14 between the UE 30 itself and the eNB 20. Then, the UE 30 causes the switching to occur from the wireless communication with one other piece of UE 30 via the communication channel 15 to the wireless communication via the communication channel 14. Accordingly, the UE 30 can suppress occurrence of interruption of communication with one other piece of UE 30 due to the degradation in the quality of the communication channel 15.

Figure 6:
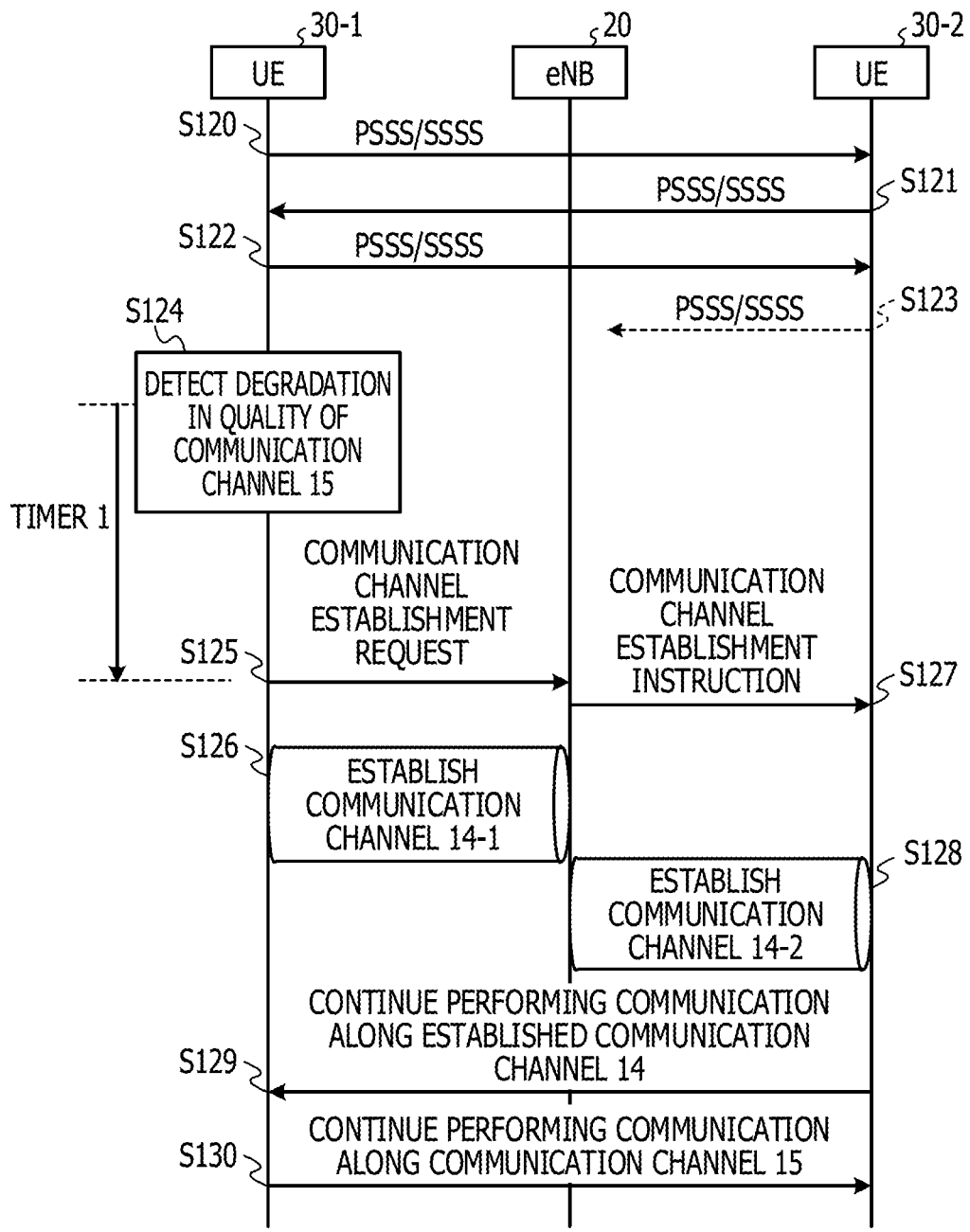
FIG. 6 is a sequence diagram illustrating an example of operation of the wireless communication system in a case where a quality of a communication channel in one direction is degraded, in the second embodiment.

Operation of the Wireless Communication System 10 in a Case where the Quality of the Communication Channel 15 in One Direction is Degraded It is noted that, due to a wireless environment of the communication channel 15, in some cases, one of the communication channel 15 via which a signal is transmitted from the UE 30-1 to the UE 30-2 and the communication channel 15 via which a signal is transmitted from the UE 30-2 to the UE 30-1 degrades a quality of the other. Operation of the wireless communication system 10 in such a situation will be described below. FIG. 6 is a sequence diagram illustrating an example of operation of the wireless communication system 10 in a case where the quality of the communication channel 15 in one direction is degraded, in the second embodiment. It is noted that, in an example that is illustrated in FIG. 6, the communication channel 14 and the communication channel 15 via which a signal is transmitted from the UE 30-1 to the UE 30-2, and the communication channel 14 and the communication channel 15 via which a signal is transmitted from the UE 30-2 to the UE 30-1 are separately managed.

First, the UE 30-1 and the UE 30-2 periodically transmit the synchronization frame 40 including the PSSS and the SSSS, via the communication channel 15 (S120 and S121). The UE 30-2 measures the quality of the communication channel 15 based on the reception quality of the synchronization frame 40 that is transmitted from the UE 30-1, and determines whether or not the measured quality of the communication channel 15 is poorer than the predetermined quality. In the example that is illustrated in FIG. 6, it is assumed that the quality of the communication channel 15 via which a signal is transmitted from the UE 30-1 to the UE 30-2 is better than the quality of the predetermined quality (S122), but that the quality of the communication channel 15 via which a signal is transmitted from the UE 30-2 to the UE 30-1 is poorer than the predetermined quality (S123).

Because the quality of the communication channel 15 via which a signal is transmitted from the UE 30-1 to the UE 30-2 is better than the predetermined quality, the UE 30-2 does not detect the degradation in the quality of the communication channel 15. On the other hand, because the quality of the communication channel 15 via which a signal is transmitted from UE 30-2 to UE 30-1 is poorer than the predetermined quality, the UE 30-1 detects the degradation in the quality of the communication channel 15 (S124). In the case where the degradation in the quality of the communication channel 15 is detected, the UE 30-1 causes the timer 1 to start. Then, in the case where the timer 1 expires, the UE 30-1 transmits the communication channel establishment request that requests establishment of the communication channel 14-1 via which a signal is transmitted from the UE 30-2 to the UE 30-1, to the eNB 20 (S125). Then, the UE 30-1 establishes the communication channel 14-1 via which a signal is transmitted from the UE 30-2 to the UE 30-1, between the UE 30-1 itself and the eNB 20 (S126).

Next, the eNB 20 transmits a communication channel establishment instruction that instructs the UE 30-2 to establish the communication channel 14-2 via which a signal is transmitted from the UE 30-2 to the UE 30-1, to the UE 30-2 (S127). The communication channel establishment instruction, for example, is a signal at Layer 2 or Layer 3 of the OSI reference model. Then, the UE 30-2 establishes the communication channel 14-2 via which data is transmitted from the UE 30-2 to the UE 30-1, between the UE 30-2 itself and the eNB 20 (S128).

Then, each of the UE 30-1 and the UE 30-2 continues performing the communication from the UE 30-2 to the UE 30-1 via the communication channel 14 that is established between each of the UE 30-1 and the UE 30-2 themselves and the eNB 20 (S129). Specifically, the UE 30-2 transmits data, which is destined for UE 30-1, via the communication channel 14-2 that is established between the UE 30-2 itself and the eNB 20, and the UE 30-1 receives the data from the UE 30-2 via the communication channel 14-1 that is established between the UE 30-1 itself and the eNB 20. Furthermore, the communication from the UE 30-1 to the UE 30-2 is continuously performed via the communication channel 15 that is established between the UE 30-1 and the UE 30-2 (S130).

In this manner, in a case where, during the wireless communication with one other piece of UE 30 via the communication channel 15, the quality of the communication channel 15 in one direction is degraded, the UE 30 establishes the communication channel 14 between the UE 30 itself and the eNB 20 for the wireless communication in the one direction, of which the quality is degraded. Then, the UE 30 switches the wireless communication in the one direction, of which the quality is degraded, from the wireless communication via the communication channel 15 to the wireless communication via the communication channel 14. Accordingly, the UE 30 can suppress the occurrence of the interruption of the communication with one other piece of UE 30 due to the degradation in the quality of the communication channel 15 in the one direction.

Third Embodiment

In a third embodiment, in a case where the quality of the communication channel 15 that is established between the UE 30 itself and one other piece of UE 30 is degraded to a degree that is lower than a predetermined quality, the UE 30 transmits the switching instruction to the one other piece of UE 30 in communication, via the communication channel 15. Then, the UE 30 in transmission via the communication channel 15 establishes the communication channel 14 between the UE 30 itself and the eNB 20. Then, the UE 30 causes the switching to occur from the wireless communication via the communication channel 15 to the wireless communication via the communication channel 14 that is established between the UE 30 itself and the eNB 20. It is noted that a configuration of a wireless communication system 10 according to the present embodiment is the same as that of the wireless communication system 10 according to the second embodiment, which is described with reference to FIG. 2, and thus that a detailed description thereof is omitted. The third embodiment is equivalent to an embodiment that is more specific in concept than the first embodiment.

Operation of the Wireless Communication System 10

Figure 7:
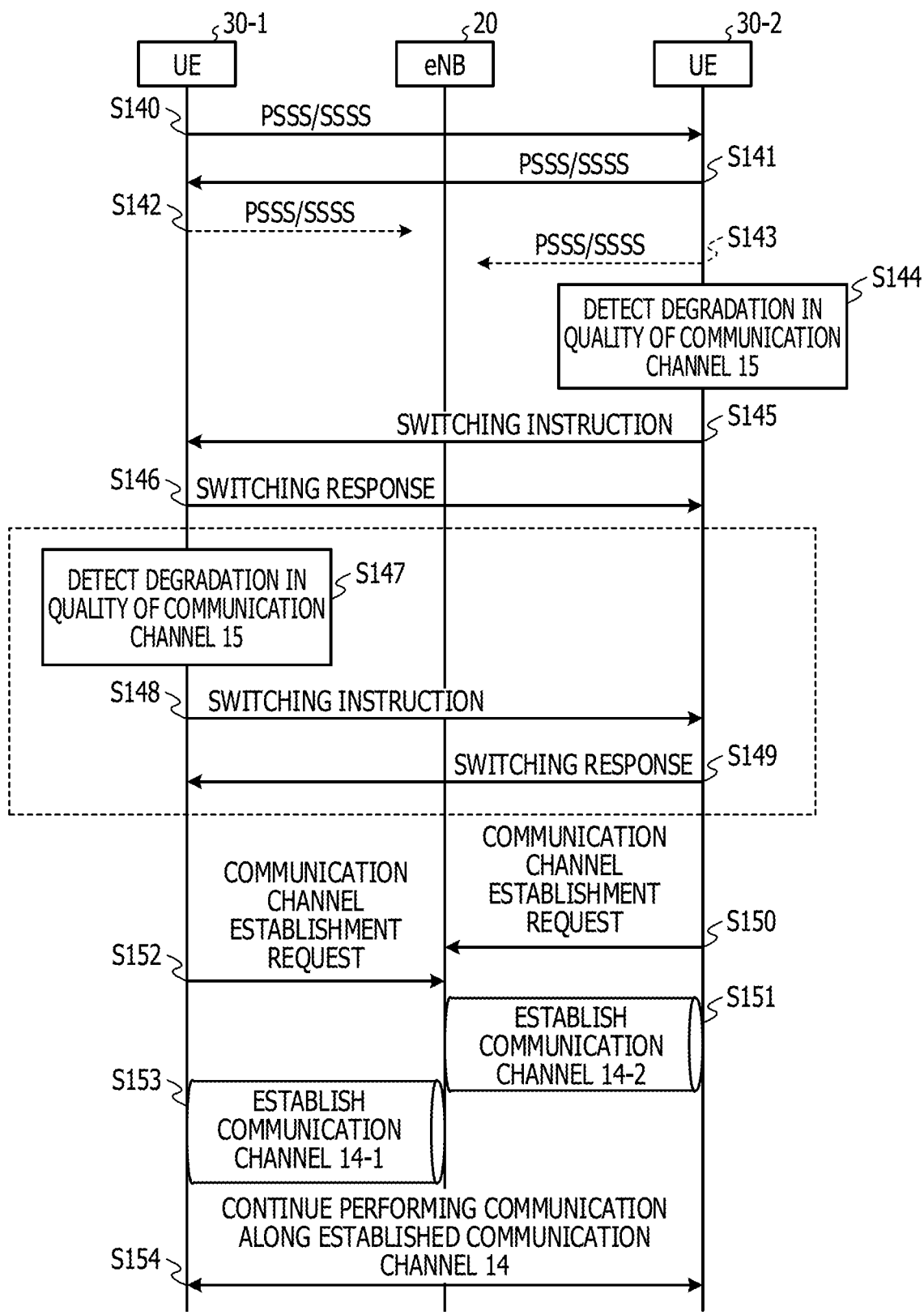
FIG. 7 is a sequence diagram illustrating an example of operation of a wireless communication system according to a third embodiment.

FIG. 7 is a sequence diagram illustrating an example of operation of the wireless communication system 10 according to the third embodiment. It is noted that, before a sequence that is illustrated in FIG. 7, each of the UE 30-1 and the UE 30-2 performs the initial access between each of the UE 30-1 and the UE 30-2 themselves and the eNB 20, and proceeds to the connection mode. Furthermore, before the sequence that is illustrated in FIG. 7, the UE 30-1 and the UE 30-2 establish the communication channel 15 and perform the D2D communication via the communication channel 15.

First, the UE 30-1 and the UE 30-2 periodically transmit the synchronization frame 40 including the PSSS and the SSSS, via the communication channel 15 (S140 and S141). The UE 30-2 measures the quality of the communication channel 15 based on the reception quality of the synchronization frame 40 that is transmitted from one other piece of UE 30, and determines whether or not the measured quality of the communication channel 15 is poorer than the predetermined quality. Then, the quality of the communication channel 15 is degraded (S142 and S143).

The UE 30-2 detects that the quality of the communication channel 15 is degraded to a degree that is lower than the predetermined quality, and thus detects the degradation in the quality of the communication channel 15 (S144). In the case where the degradation in the quality of the communication channel 15 is detected, the UE 30-2 transmits the switching instruction to the UE 30-1 via the communication channel 15 (S145). The switching instruction, for example, is a signal at Layer 2 or Layer 3 of the OSI reference.

In a case where the switching instruction is received from the UE 30-2 via the communication channel 15, the UE 30-1 replies to the UE 30-2 with a switching response via the communication channel 15 (S146). It is noted that, in a case where there is a master-slave relationship between the UE 30-1 and the UE 30-2, in which one is a master and the other is a slave, the UE 30 that operates as a master may detect the degradation in the quality of the communication channel 15 and may transmit the switching instruction to the UE 30 that operates as a slave. Furthermore, in a case where such a master-slave relationship is not present, for example, as illustrated in Steps S147 to S149, the UE 30 may detect the degradation in the quality of the communication channel 15 and may transmit the switching instruction to one other piece of UE 30, and the one other piece of UE 30 may reply with the switching response.

In a case where, in Step S146, the UE 30-2 receives the switching response from the UE 30-1, the UE 30-2 replies to the eNB 20 with the communication channel establishment request (S150). Then, the UE 30-2 establishes the communication channel 14-2 between the UE 30-2 itself and the eNB 20 (S151). Furthermore, the UE 30-1 replies to the UE 30-2 with the switching response in Step S146, and then transmits the communication channel establishment request to the eNB 20 (152). Then, the UE 30-2 establishes the communication channel 14-1 between the UE 30-1 itself and the eNB 20 (S153). Then, each of the UE 30-1 and the UE 30-2 causes the switching to occur from the communication via the communication channel 15 to the communication via the communication channel 14 that is established between each of the UE 30-1 and the UE 30-2 themselves and the eNB 20, and continues performing the communication (S154).

In this manner, in a case where, during the wireless communication with one other piece of UE 30 via the communication channel 15, the quality of the communication channel 15 is poorer than the predetermined quality, the UE 30 according to the present embodiment transmits the switching instruction to the one other piece of UE 30 via the communication channel 15. Then, in the case where the response to the switching instruction is received, the UE 30 establishes the communication channel 14 between the UE 30 itself and the eNB 20, and causes the switching to occur from the wireless communication with one other piece of UE 30 via the communication channel 15 to the wireless communication via the communication channel 14. Accordingly, the UE 30 can synchronize communication channels that are used for communication, to each other, and can switch between the communication channels. Accordingly, the time for which the transmission data stays within the UE 30 can be shortened, and the size of the transmission buffer that is provided within the UE 30 can be decreased.

Figure 8:
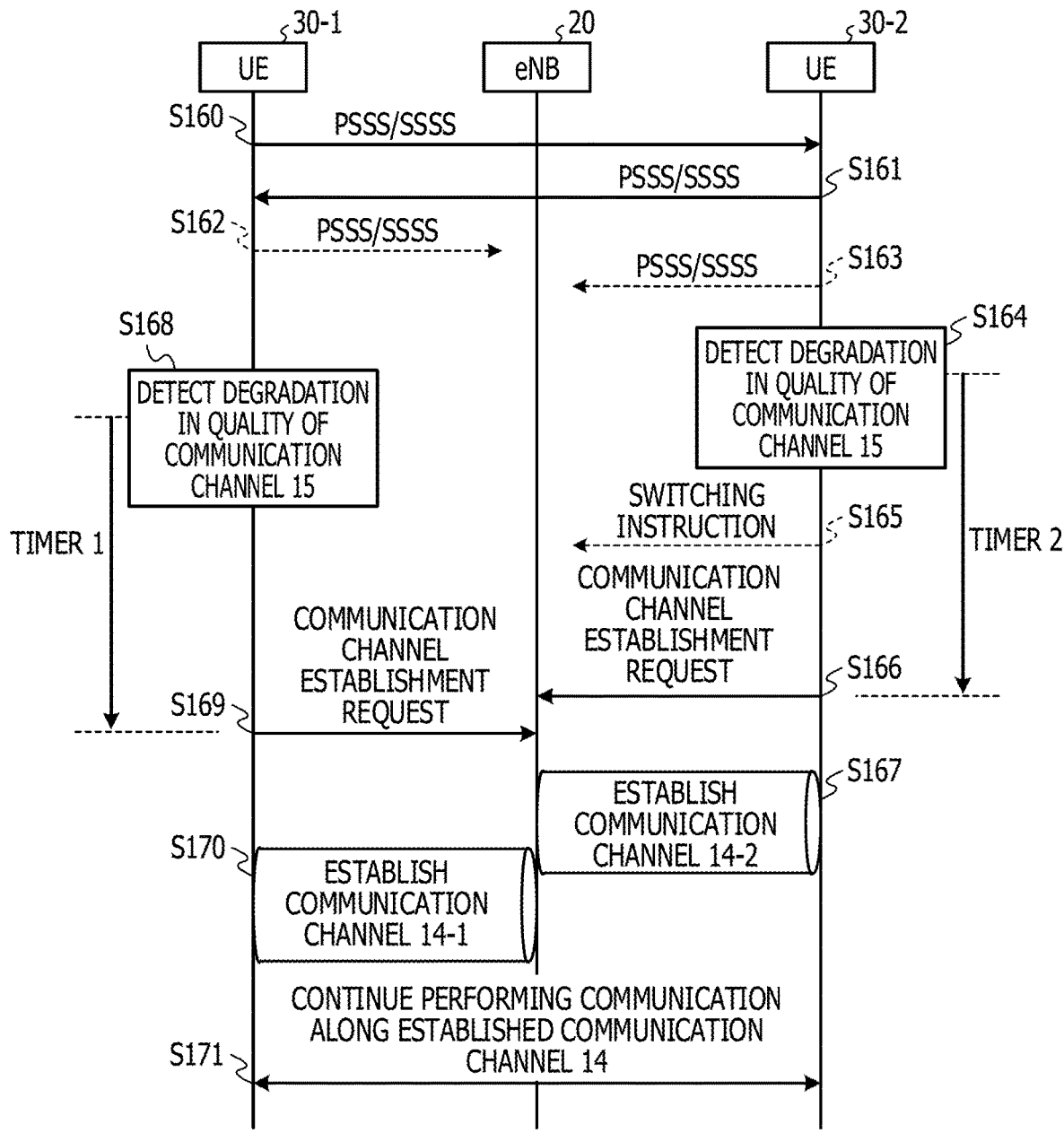
FIG. 8 is a sequence diagram illustrating an example of operation of the wireless communication system in a case where a switching instruction is not received, in the third embodiment.

Operation of the Wireless Communication System 10 in a Case where the Switching Instruction is not Received It is noted that, in a case where the wireless environment of the communication channel 15 abruptly changes, in some cases, the switching instruction that is transmitted from the UE 30-2 to the UE 30-1 is not received in the UE 30-1. A mechanism that, in such a situation, suppresses the occurrence of the interruption of the communication between pieces of UE 30 themselves will be described below. FIG. 8 is a sequence diagram illustrating an example of operation of the wireless communication system 10 in a case where the switching instruction is not received, in the third embodiment.

First, the UE 30-1 and the UE 30-2 periodically transmit the synchronization frame 40 including the PSSS and the SSSS, via the communication channel 15 (S160 and S161). The UE 30-2 measures the quality of the communication channel 15 based on the reception quality of the synchronization frame 40 that is transmitted from one other piece of UE 30, and determines whether or not the measured quality of the communication channel 15 is poorer than the predetermined quality. Then, the quality of the communication channel 15 is degraded (S162 and S163). The UE 30-2 detects that the quality of the communication channel 15 is degraded to a degree that is lower than the predetermined quality, and thus detects the degradation in the quality of the communication channel 15 (S164).

In the case where the degradation in the quality of the communication channel 15 is detected, the UE 30-2 causes the timer 2 to be reset for restarting. Then, the UE 30-2 transmits the switching instruction to the UE 30-1 via the communication channel 15 (S165). In an example in FIG. 8, because the quality of the communication channel 15 is poor, the switching instruction that is transmitted from the UE 30-2 is not received in the UE 30-1. For this reason, the UE 30-1 does not reply with the switching response. However, even in a case where the switching response is not received, in a case where the timer 2 expires, the UE 30-2 transmits the communication channel establishment request to the eNB 20 (S166). Then, the UE 30-2 establishes the communication channel 14-2 between the UE 30-2 itself and the eNB 20 (S167).

On the other hand, based on the reception quality of the synchronization frame 40 that is received from the UE 30-2, the UE 30-1 detects the degradation in the quality of the communication channel 15 (S168). In the case where the degradation in the quality of the communication channel 15 is detected, the UE 30-1 causes the timer 1 to be reset for restarting. Then, even in a case where the switching response is not received from the UE 30-2, if the timer 1 expires, the UE 30-1 transmits the communication channel establishment request to the eNB 20 (S169). Then, the UE 30-1 establishes the communication channel 14-1 between the UE 30-1 itself and the eNB 20 (S170). Then, each of the UE 30-1 and UE 30-2 causes the switching to occur from the communication via the communication channel 15 to the communication via the communication channel 14 that is established between each of the UE 30-1 and the UE 30-2 themselves and the eNB 20, and continues performing the communication (S171).

In this manner, even in a case where the response to the switching instruction that is transmitted to the one other piece of UE 30 via the communication channel 15 is not received, if the state where the quality of the communication channel 15 is poorer than the predetermined quality continues for the predetermined time or longer, the UE 30 according to the present embodiment establishes the communication channel 14 between the UE 30 itself and the eNB 20. Then, UE 30 causes the switching to occur from the wireless communication with one other piece of UE 30 via the communication channel 15 to the wireless communication via the communication channel 14. Accordingly, the UE 30 can suppress the occurrence of the interruption of the communication with one other piece of UE 30 due to the degradation in the quality of the communication channel 15.

Figure 9:
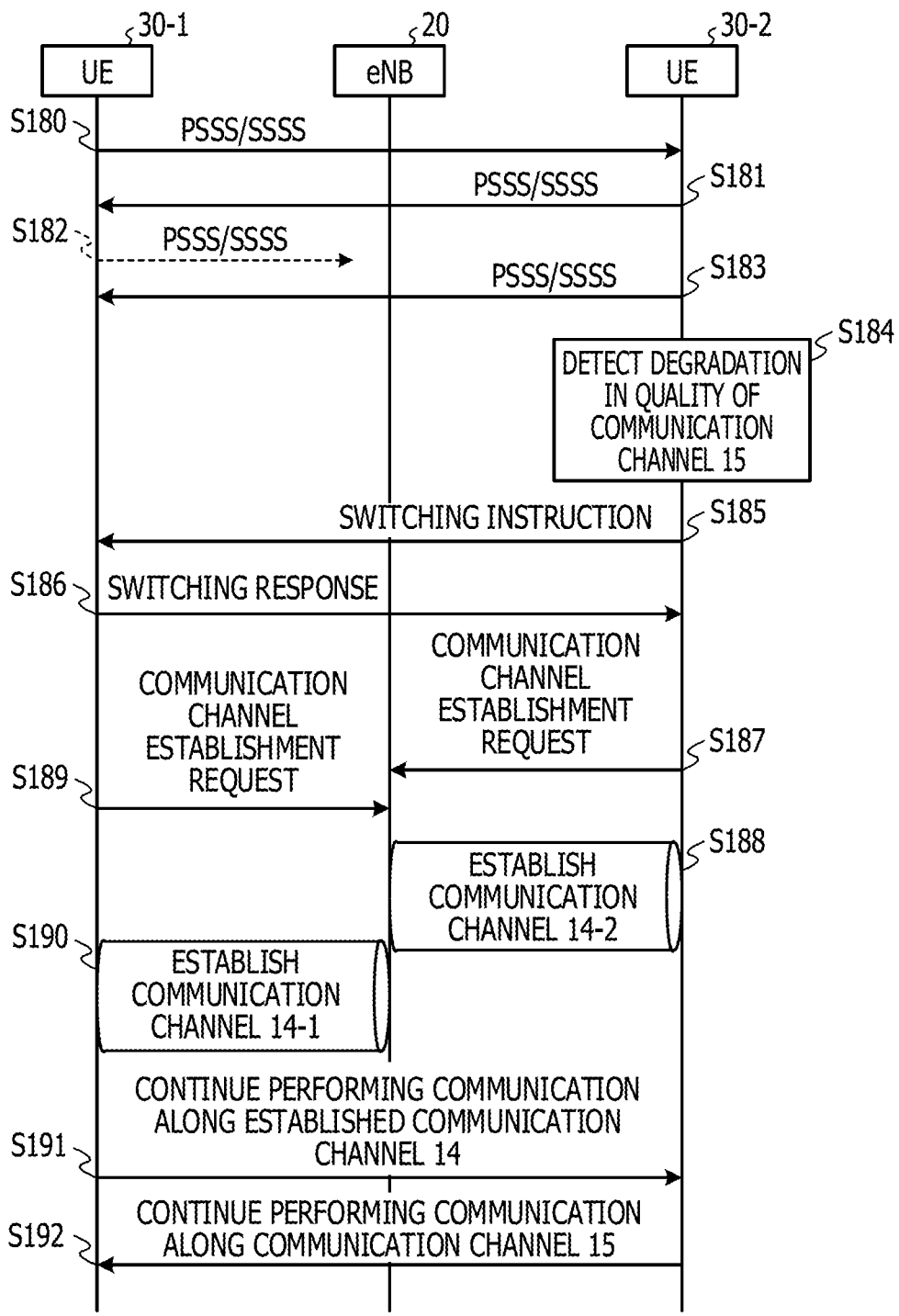
FIG. 9 is a sequence diagram illustrating an example of operation of the wireless communication system in the case where the quality of the communication channel in one direction is degraded, in the third embodiment.

Operation of the Wireless Communication System 10 in the Case where the Quality of the Communication Channel 15 in One Direction is Degraded Furthermore, due to the wireless environment of the communication channel 15, in some cases, one of the communication channel 15 via which a signal is transmitted from the UE 30-1 to the UE 30-2 and the communication channel 15 via which a signal is transmitted from the UE 30-2 to the UE 30-1 degrades the quality of the other. Operation of the wireless communication system 10 in such a situation will be described below. FIG. 9 is a sequence diagram illustrating an example of operation of the wireless communication system 10 in the case where the quality of the communication channel 15 in one direction is degraded, in the third embodiment. It is noted that, in an example that is illustrated in FIG. 9, the communication channel 14 and the communication channel 15 via which a signal is transmitted from the UE 30-1 to the UE 30-2, and the communication channel 14 and the communication channel 15 via which a signal is transmitted from the UE 30-2 to the UE 30-1 are separately managed.

First, the UE 30-1 and the UE 30-2 periodically transmit the synchronization frame 40 including the PSSS and the SSSS, via the communication channel 15 (S180 and S181). The UE 30-2 measures the quality of the communication channel 15 based on the reception quality of the synchronization frame 40 that is transmitted from the UE 30-1, and determines whether or not the measured quality of the communication channel 15 is poorer than the predetermined quality. In the example that is illustrated in FIG. 9, it is assumed that the quality of the communication channel 15 via which a signal is transmitted from the UE 30-1 to the UE 30-2 is poorer than the quality of the predetermined quality (S182), but that the quality of the communication channel 15 via which a signal is transmitted from the UE 30-2 to the UE 30-1 is better than the predetermined quality (S183).

The UE 30-2 detects that the quality of the communication channel 15 via which a signal is transmitted from the UE 30-1 to UE 30-2 is degraded to a degree that is lower than the predetermined quality, and thus detects the degradation in the quality of the communication channel 15 (S184). In the case where the degradation in the quality of the communication channel 15 is detected, the UE 30-2 transmits the switching instruction to the UE 30-1 via the communication channel 15 (S185). In a case where the switching instruction is received from the UE 30-2 via the communication channel 15, the UE 30-1 replies to the UE 30-2 with the switching response via the communication channel 15 (S186).

In a case where the switching response is received from the UE 30-1, the UE 30-2 transmits the communication channel establishment request that requests the establishment of the communication channel 14-2 via which a signal is transmitted from the UE 30-1 to the UE 30-2, to the eNB 20 (S187). Then, the UE 30-2 establishes the communication channel 14-2 via which a signal is transmitted from the UE 30-1 to the UE 30-2, between the UE 30-2 itself and the eNB 20 (S188). Furthermore, because the degradation in the quality of the communication channel 15 is not detected, after the switching response is transmitted to the UE 30-2, the UE 30-1 transmits the communication channel establishment request that requests the eNB 20 to establish the communication channel 14-1 via which a signal is transmitted from the UE 30-1 to the UE 30-2, the eNB 20 (S189). Then, the UE 30-2 establishes the communication channel 14-1 via which a signal is transmitted from the UE 30-1 to the UE 30-2, between the UE 30-2 itself and the eNB 20 (S190).

Then, each of the UE 30-1 and the UE 30-2 continues performing the communication from the UE 30-1 to the UE 30-2 via the communication channel 14 that is established between each of the UE 30-1 and the UE 30-2 themselves and the eNB 20 (S191). Specifically, the UE 30-1 transmits data, which is destined for the UE 30-2, via the communication channel 14-1 that is established between the UE 30-1 itself and the eNB 20, and the UE 30-2 receives the data from the UE 30-1 via the communication channel 14-2 that is established between the UE 30-2 itself and the eNB 20. Furthermore, the communication from the UE 30-2 to the UE 30-1 is continuously performed via the communication channel 15 that is already established between the UE 30-1 and the UE 30-2 (S192).

In this manner, in the case where, during the wireless communication with one other piece of UE 30 via the communication channel 15, the quality of the communication channel 15 in one direction is degraded, the UE 30 transmits the switching instruction to the one other piece of UE 30 via the communication channel 15. Then, in the case where the response to the switching instruction is received, the UE 30 establishes the communication channel 14 between the UE 30 itself and the eNB 20 for the wireless communication in the one direction, of which the quality is degraded. Then, the UE 30 switches the wireless communication in the one direction, of which the quality is degraded, from the wireless communication via the communication channel 15 to the wireless communication via the communication channel 14. Accordingly, the UE 30 can suppress the occurrence of the interruption of the communication with one other piece of UE 30 due to the degradation in the quality of the communication channel 15 in the one direction.

Figure 10:
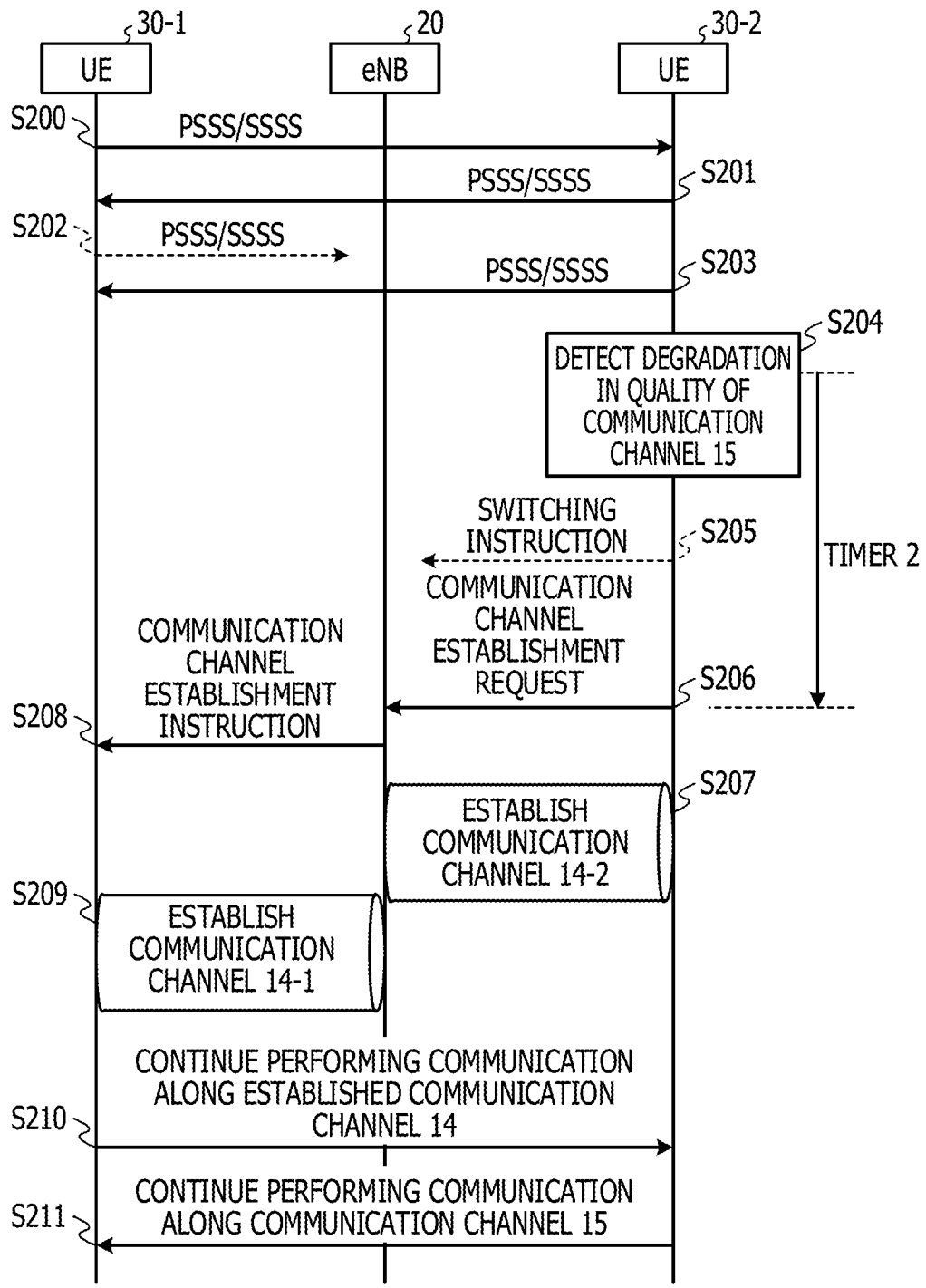
FIG. 10 is a sequence diagram illustrating an example of operation of the wireless communication system in a case where the quality of the communication channel in one direction is degraded and where the switching instruction is not received, in the third embodiment.

Operation of the Wireless Communication System 10 in a Case where the Quality of the Communication Channel 15 is Degraded and where the Switching Instruction is not Received Furthermore, due to the wireless environment of the communication channel 15, in some cases, one of the communication channel 15 via which a signal is transmitted from the UE 30-1 to the UE 30-2 and the communication channel 15 via which a signal is transmitted from the UE 30-2 to the UE 30-1 degrades the quality of the other and via with this, the switching instruction is not received. Operation of the wireless communication system 10 in such a situation will be described below. FIG. 10 is a sequence diagram illustrating an example of operation of the wireless communication system 10 in a case where the quality of the communication channel in one direction is degraded and where the switching instruction is not received, in the third embodiment. It is noted that, in an example that is illustrated in FIG. 10, the communication channel 14 and the communication channel 15 via which a signal is transmitted from the UE 30-1 to the UE 30-2, and the communication channel 14 and the communication channel 15 via which a signal is transmitted from the UE 30-2 to the UE 30-1 are separately managed.

First, the UE 30-1 and the UE 30-2 periodically transmit the synchronization frame 40 including the PSSS and the SSSS, via the communication channel 15 (S200 and S201). The UE 30-2 measures the quality of the communication channel 15 based on the reception quality of the synchronization frame 40 that is transmitted from the UE 30-1, and determines whether or not the measured quality of the communication channel 15 is poorer than the predetermined quality. In the example that is illustrated in FIG. 10, it is assumed that the quality of the communication channel 15 via which a signal is transmitted from the UE 30-1 to the UE 30-2 is degraded to a degree that is lower than the quality of the predetermined quality (S202), but that the quality of the communication channel 15 via which a signal is transmitted from the UE 30-2 to the UE 30-1 is better than the predetermined quality (S203).

The UE 30-2 detects that the quality of the communication channel 15 via which a signal is transmitted from the UE 30-1 to UE 30-2 is degraded to a degree that is lower than the predetermined quality, and thus detects the degradation in the quality of the communication channel 15 (S204). In the case where the degradation in the quality of the communication channel 15 is detected, the UE 30-2 causes the timer 2 to be reset for restarting. Then, the UE 30-2 transmits the switching instruction to the UE 30-1 via the communication channel 15 (S205). In the example in FIG. 10, because the switching instruction that is transmitted from the UE 30-2 is not received in the UE 30-1, the UE 30-1 does not reply with the switching response. However, even in the case where the switching response is not received, in the case where the timer 2 expires, the UE 30-2 transmits the communication channel establishment request that requests the establishment of the communication channel 14-2 via which a signal is transmitted from the UE 30-1 to the UE 30-2, to the eNB 20 (S206). Then, the UE 30-2 establishes the communication channel 14-2 via which a signal is transmitted from the UE 30-1 to the UE 30-2, between the UE 30-2 itself and the eNB 20 (S207).

Next, the eNB 20 transmits the communication channel establishment instruction that instructs the UE 30-1 to establish the communication channel 14-1 via which a signal is transmitted from the UE 30-1 to the UE 30-2, to the UE 30-1 (S208). The UE 30-1 establishes the communication channel 14-1 via which a signal is transmitted from the UE 30-1 to the UE 30-2, between the UE 30-1 itself and the eNB 20 (S209).

Then, each of the UE 30-1 and the UE 30-2 continues performing the communication from the UE 30-1 to the UE 30-2 via the communication channel 14 that is established between each of the UE 30-1 and the UE 30-2 themselves and the eNB 20 (S210). Specifically, the UE 30-1 transmits data, which is destined for the UE 30-2, via the communication channel 14-1 that is established between the UE 30-1 itself and the eNB 20, and the UE 30-2 receives the data from the UE 30-1 via the communication channel 14-2 that is established between the UE 30-2 itself and the eNB 20. Furthermore, the communication from the UE 30-2 to the UE 30-1 is continuously performed via the communication channel 15 that is already established between the UE 30-1 and the UE 30-2 (S211).

In this manner, even in the case where the response to the switching instruction is not received, if the state where the quality of the communication channel 15 is poorer than the predetermined quality continues for the predetermined time or longer, the UE 30 according to the present embodiment establishes the communication channel 14 between the UE 30 itself and the eNB 20. Then, UE 30 causes the switching to occur from the wireless communication with one other piece of UE 30 via the communication channel 15 to the wireless communication via the communication channel 14. Accordingly, the UE 30 can suppress the occurrence of the interruption of the communication with one other piece of UE 30 due to the degradation in the quality of the communication channel 15.

Fourth Embodiment

In a fourth embodiment, in the case where the quality of the communication channel 15 that is established between the UE 30 itself and one other piece of UE 30 is degraded to a degree that is lower than the predetermined quality, a result of the measurement of the quality of the communication channel 15 is transmitted to the eNB 20. In a case where the quality of the communication channel 15 is poorer than the predetermined quality, the eNB 20 establishes the communication channel 14 between the eNB 20 itself and the UE 30. Then, the eNB 20 instructs the UE 30 to cause the switching to occur from the wireless communication between the piece of UE 30 themselves via the communication channel 15 to the wireless communication via the communication channel 14 between eNBs 20 themselves. It is noted that a configuration of a wireless communication system 10 according to the present embodiment is the same as that of the wireless communication system 10 according to the second embodiment, which is described with reference to FIG. 2, and thus that a detailed description thereof is omitted. The fourth embodiment is equivalent to an embodiment that is more specific in concept than the first embodiment.

Operation of the Wireless Communication System 10

Figure 11:
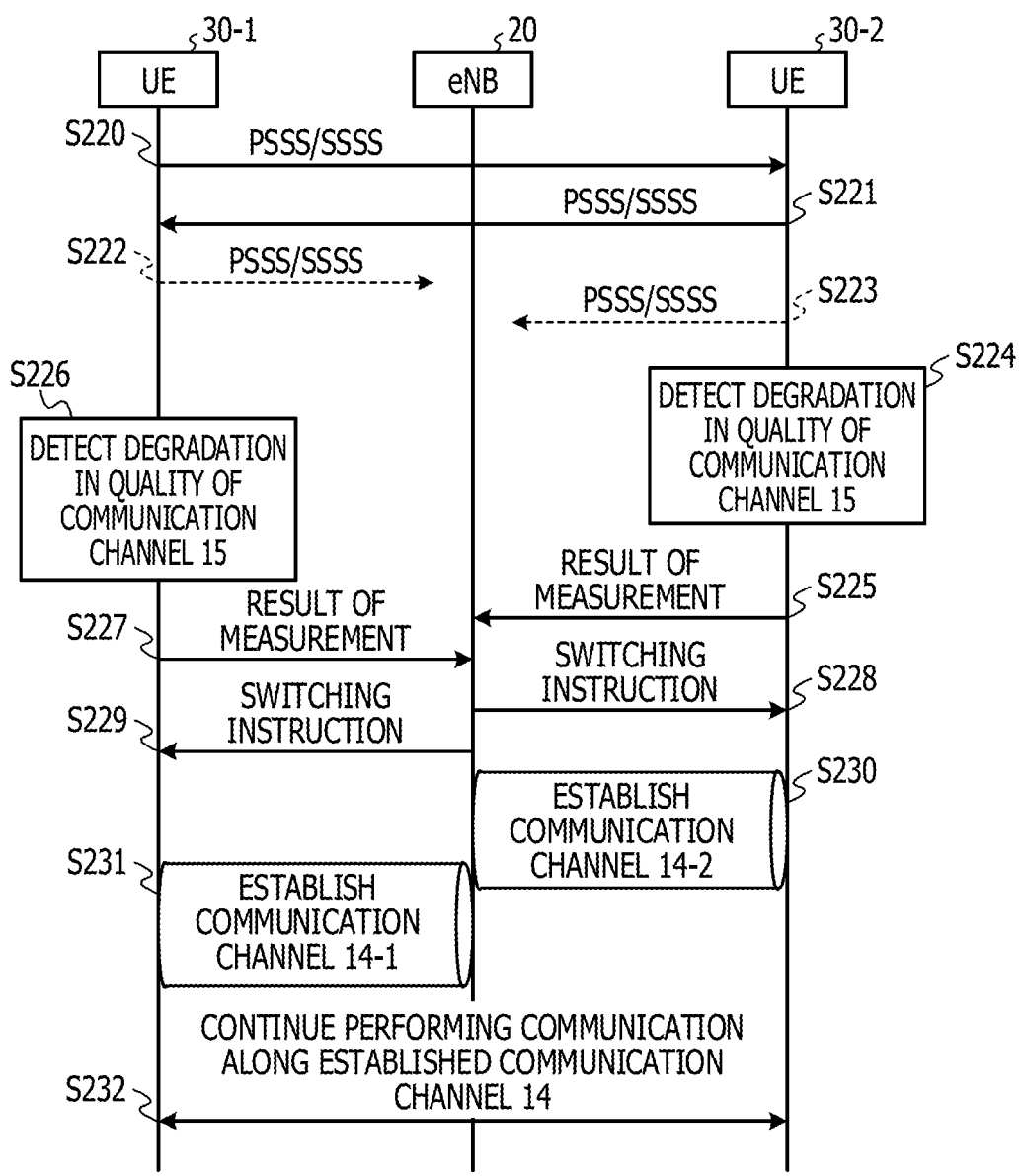
FIG. 11 is a sequence diagram illustrating an example of operation of a wireless communication system according to a fourth embodiment.

FIG. 11 is a sequence diagram illustrating an example of operation of the wireless communication system 10 according to the fourth embodiment. It is noted that, before a sequence that is illustrated in FIG. 11, each of the UE 30-1 and the UE 30-2 performs the initial access between each of the UE 30-1 and the UE 30-2 themselves and the eNB 20, and proceeds to the connection mode. Furthermore, before the sequence that is illustrated in FIG. 11, the UE 30-1 and the UE 30-2 establish the communication channel 15 and perform the D2D communication via the communication channel 15.

First, the UE 30-1 and the UE 30-2 periodically transmit the synchronization frame 40 including the PSSS and the SSSS, via the communication channel 15 (S220 and S221). The UE 30-2 measures the quality of the communication channel 15 based on the reception quality of the synchronization frame 40 that is transmitted from one other piece of UE 30, and determines whether or not the measured quality of the communication channel 15 is poorer than the predetermined quality. Then, the quality of the communication channel 15 is degraded (S222 and S223). The UE 30-2 detects that the quality of the communication channel 15 is degraded to a degree that is lower than the predetermined quality, and thus detects the degradation in the quality of the communication channel 15 (S224). Then, the UE 30-2 transmits a result of measurement of the reception quality of the synchronization frame 40 to the eNB 20 (S225).

In the same manner, the UE 30-1 detects that the quality of the communication channel 15 is degraded to a degree that is lower than the predetermined quality, and thus detects the degradation in the quality of the communication channel 15 (S226). Then, the UE 30-1 transmits the result of the measurement of the quality of the communication channel 15 to the eNB 20 (S227). The result of the measurement is transmitted, for example, using a measurement report that is an RRC signal. It is noted that as another example, the result of the measurement may be transmitted using any other signal that is used at Layer 2 or Layer 3 of the OSI reference model.

In a case where the quality of the communication channel 15, which is indicated with the result of the measurement that is received from each of the UE 30-1 and the UE 30-2, is poorer than the predetermined quality, the eNB 20 transmits the switching instruction to the UE 30-1 and the UE 30-2 (S228 and S229). The switching instruction, for example, is a signal at Layer 2 or Layer 3 of the OSI reference.

In a case where the switching instruction is received from the eNB 20, the UE 30-2 establishes the communication channel 14-2 between the UE 30-2 itself and the eNB 20 (S230). In the case where the switching instruction is received from the eNB 20, the UE 30-1 establishes the communication channel 14-1 between the UE 30-1 itself and the eNB 20 (S231). Then, each of the UE 30-1 and the UE 30-2 causes the switching to occur from the communication via the communication channel 15 to the communication via the communication channel 14 that is established between each of the UE 30-1 and the UE 30-2 themselves and the eNB 20, and continues performing the communication (S232).

In this manner, in a case where, during the wireless communication with one other piece of UE 30 via the communication channel 15, the quality of the communication channel 15 is poorer than the predetermined quality, the UE 30 according to the present embodiment transmits the result of the measurement of the quality of the communication channel 15 to the eNB 20. In a case where the quality of the communication channel 15 that is indicated with the result of the measurement which is received from the UE 30 is poorer than the predetermined quality, the eNB 20 transmits the switching instruction to the UE 30, and establishes the communication channel 14 between the eNB 20 itself and the UE 30. Then, the UE 30 causes the switching to occur from the wireless communication with one other piece of UE 30 via the communication channel 15 to the wireless communication via the communication channel 14 that is established between the UE 30 itself and the eNB 20. The switching is caused to occur between the communication channels that are used by the pieces of UE 30 for communication, according to the switching instructions that are received from the eNB 20, and thus the suppression of the occurrence of the interruption of the communication between the pieces of UE 30 themselves can be realized with high reliability.

Figure 12:
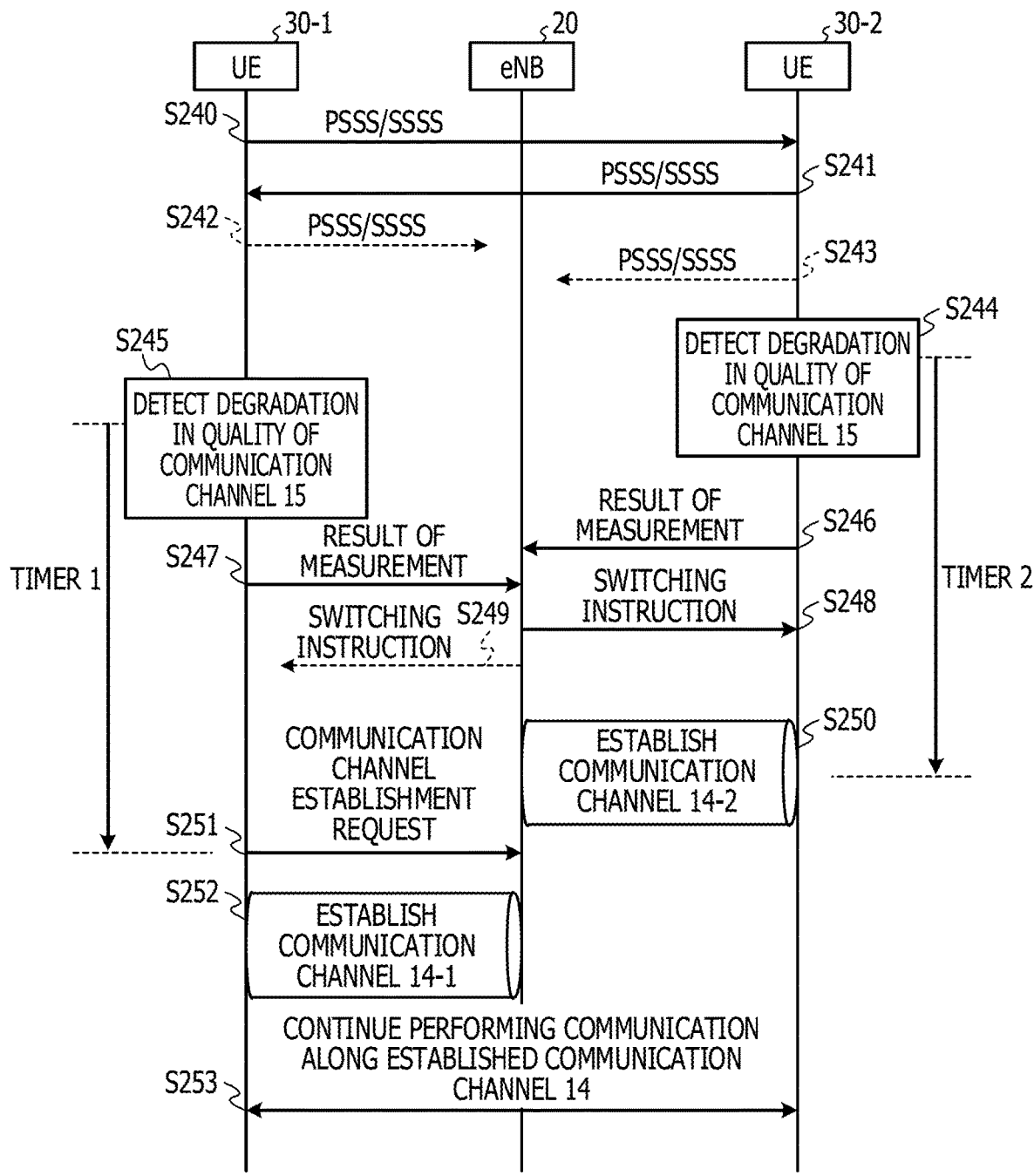
FIG. 12 is a sequence diagram illustrating an example of operation of the wireless communication system in the case where the switching instruction is not received, in the fourth embodiment.

Operation of the Wireless Communication System 10 in the Case where the Switching Instruction is not Received It is noted that, due to a wireless environment between the UE 30 and the eNB 20, in some cases, the switching instruction from the eNB 20 is not received in the UE 30. A mechanism that, in such a situation, suppresses the occurrence of the interruption of the communication between the pieces of UE 30 themselves will be described below. FIG. 12 is a sequence diagram illustrating an example of operation of the wireless communication system 10 in the case where the switching instruction is not received, in the fourth embodiment.

First, the UE 30-1 and the UE 30-2 periodically transmit the synchronization frame 40 including the PSSS the SSSS, via the communication channel 15 (S240 and S241). The UE 30-2 measures the quality of the communication channel 15 based on the reception quality of the synchronization frame 40 that is transmitted from one other piece of UE 30, and determines whether or not the measured quality of the communication channel 15 is poorer than the predetermined quality. Then, the quality of the communication channel 15 is degraded (S242 and S243).

The UE 30-1 and the UE 30-2 detect that the quality of the communication channel 15 is degraded to a degree that is lower than the predetermined quality, and thus detect the degradation in the quality of the communication channel 15 (S244 and S245). In the case where the degradation in the quality of the communication channel 15 is detected, the UE 30-1 causes the timer 1 to be reset for restarting, and the UE 30-2 causes the timer 2 to be reset for restarting. Then, the UE 30-1 and the UE 30-2 transmit the result of the measurement of the quality of the communication channel 15 to the eNB 20 (S246 and S247).

In the case where the quality of the communication channel 15, which is indicated with the result of the measurement that is received from each of the UE 30-1 and the UE 30-2, is poorer than the predetermined quality, the eNB 20 transmits the switching instruction to the UE 30-1 and the UE 30-2 (S248 and S249). In an example that is illustrated in FIG. 12, the switching instruction that is transmitted from the eNB 20 is received in the UE 30-2, but is not received in the UE 30-1. Because the switching instruction is received from the eNB 20 before the timer 2 expires, the UE 30-2 establishes the communication channel 14-2 between the UE 30-2 itself and the eNB 20 (S250).

On the other hand, the UE 30-1 does not receive the switching instruction from the eNB 20, but, due to the expiration of the timer 1, transmits the communication channel establishment request to the eNB 20 (S251). Then, the UE 30-1 establishes the communication channel 14-1 between the UE 30-1 itself and the eNB 20 (S252). Then, each of the UE 30-1 and the UE 30-2 causes the switching to occur from the communication via the communication channel 15 to the communication via the communication channel 14 that is established between each of the UE 30-1 and the UE 30-2 themselves and the eNB 20 and continues performing the communication (S253).

In this manner, even in the case where the switching instruction is not received from the eNB 20, if the state where the quality of the communication channel 15 is poorer than the predetermined quality continues for the predetermined time or longer, the UE 30 establishes the communication channel 14 between the UE 30 itself and the eNB 20. Then, the UE 30 causes the switching to occur from the wireless communication with one other piece of UE 30 via the communication channel 15 to the wireless communication via the communication channel 14. Accordingly, even in a case where the reception of the switching instruction from the eNB 20 fails, the UE 30 can suppress the occurrence of the interruption of the communication with one other piece of UE 30 due to the degradation in the quality of the communication channel 15.

Figure 13:
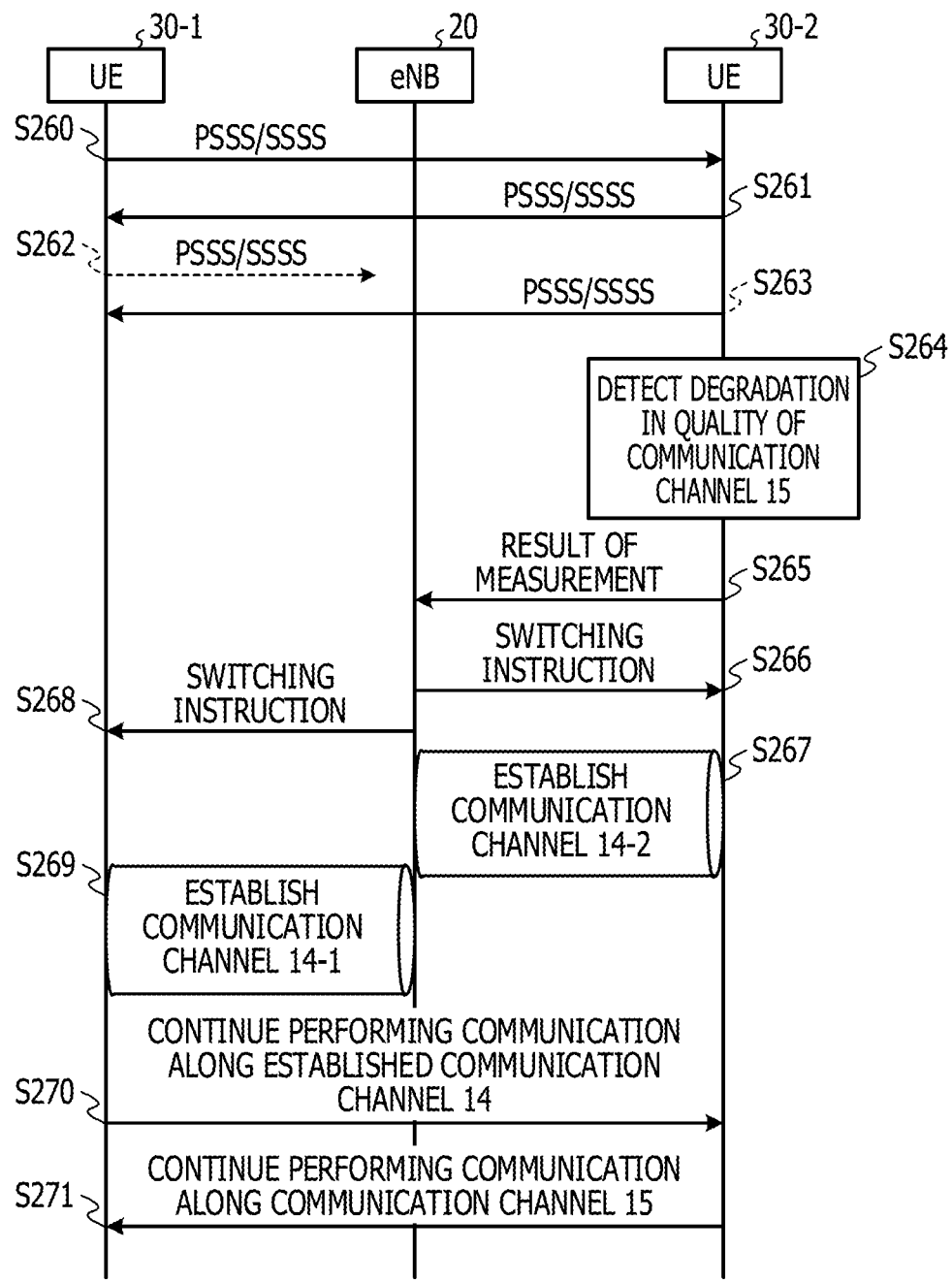
FIG. 13 is a sequence diagram illustrating an example of operation of the wireless communication system in the case where the quality of the communication channel in one direction is degraded, in the fourth embodiment.

Operation of the Wireless Communication System 10 in the Case where the Quality of the Communication Channel 15 in One Direction is Degraded Furthermore, due to the wireless environment of the communication channel 15, in some cases, one of the communication channel 15 via which a signal is transmitted from the UE 30-1 to the UE 30-2 and the communication channel 15 via which a signal is transmitted from the UE 30-2 to the UE 30-1 degrades the quality of the other. Operation of the wireless communication system 10 in such a situation will be described below. FIG. 13 is a sequence diagram illustrating an example of operation of the wireless communication system 10 in the case where the quality of the communication channel 15 in one direction is degraded, in the fourth embodiment. It is noted that, in an example that is illustrated in FIG. 13, the communication channel 14 and the communication channel 15 via which a signal is transmitted from the UE 30-1 to the UE 30-2, and the communication channel 14 and the communication channel 15 via which a signal is transmitted from the UE 30-2 to the UE 30-1 are separately managed.

First, the UE 30-1 and the UE 30-2 periodically transmit the synchronization frame 40 including the PSSS and the SSSS, via the communication channel 15 (S260 and S261). The UE 30-2 measures the quality of the communication channel 15 based on the reception quality of the synchronization frame 40 that is transmitted from the UE 30-1, and determines whether or not the measured quality of the communication channel 15 is poorer than the predetermined quality. In the example that is illustrated in FIG. 13, it is assumed that the quality of the communication channel 15 via which a signal is transmitted from the UE 30-1 to the UE 30-2 is degraded to a degree that is lower than the quality of the predetermined quality (S262), but that the quality of the communication channel 15 via which a signal is transmitted from the UE 30-2 to the UE 30-1 is better than the predetermined quality (S263).

The UE 30-2 detects that the quality of the communication channel 15 via which a signal is transmitted from the UE 30-1 to UE 30-2 is degraded to a degree that is lower than the predetermined quality, and thus detects the degradation in the quality of the communication channel 15 (S264). In the case where the degradation in the quality of the communication channel 15 is detected, the UE 30-2 transmits the result of the measurement of the quality of the communication channel 15 to the eNB 20 (S265).

The eNB 20 receives the result of the measurement from the UE 30-2, but does not receive the result of the measurement from the UE 30-1. The fact that the result of the measurement is not received from the UE 30-1 means that the degradation in the quality of the communication channel 15 is not detected in the UE 30-1. For this reason, the eNB 20 transmits the switching instruction that instructs the UE 30-2 to establish the communication channel 14-2 via which a signal is transmitted from the UE 30-1 to the UE 30-2, to the UE 30-2 (S266). The UE 30-2 establishes the communication channel 14-2 via which a signal is transmitted from the UE 30-1 to the UE 30-2, between the UE 30-2 itself and the eNB 20 (S267).

Furthermore, the eNB 20 transmits the switching instruction that instructs the UE 30-1 to establish the communication channel 14-1 via which a signal is transmitted from the UE 30-1 to the UE 30-2, to the UE 30-1 (S268). The UE 30-1 establishes the communication channel 14-1 via which a signal is transmitted from the UE 30-1 to the UE 30-2, between the UE 30-1 itself and the eNB 20 (S269).

Then, each of the UE 30-1 and the UE 30-2 continues performing the communication from the UE 30-1 to the UE 30-2 via the communication channel 14 that is established between each of the UE 30-1 and the UE 30-2 themselves and the eNB 20 (S270). Specifically, the UE 30-1 transmits data, which is destined for the UE 30-2, via the communication channel 14-1 that is established between the UE 30-1 itself and the eNB 20, and the UE 30-2 receives the data from the UE 30-1 via the communication channel 14-2 that is established between the UE 30-2 itself and the eNB 20. Furthermore, the communication from the UE 30-2 to the UE 30-1 is continuously performed via the communication channel 15 that is already established between the UE 30-1 and the UE 30-2 (S271).

In this manner, in the case where the quality of the communication channel 15 in one direction is degraded, the eNB 20 establishes the communication channel 14 between the eNB 20 itself and the UE 30 for the wireless communication in the one direction, of which the quality is degraded. Then, the UE 30 switches the wireless communication in the one direction, of which the quality is degraded, from the wireless communication via the communication channel 15 to the wireless communication via the communication channel 14. Accordingly, the eNB 20 can suppress the occurrence of the interruption of the communication between the pieces of UE 30 themselves due to the degradation in the quality of the communication channel 15 in the one direction.

Figure 14:
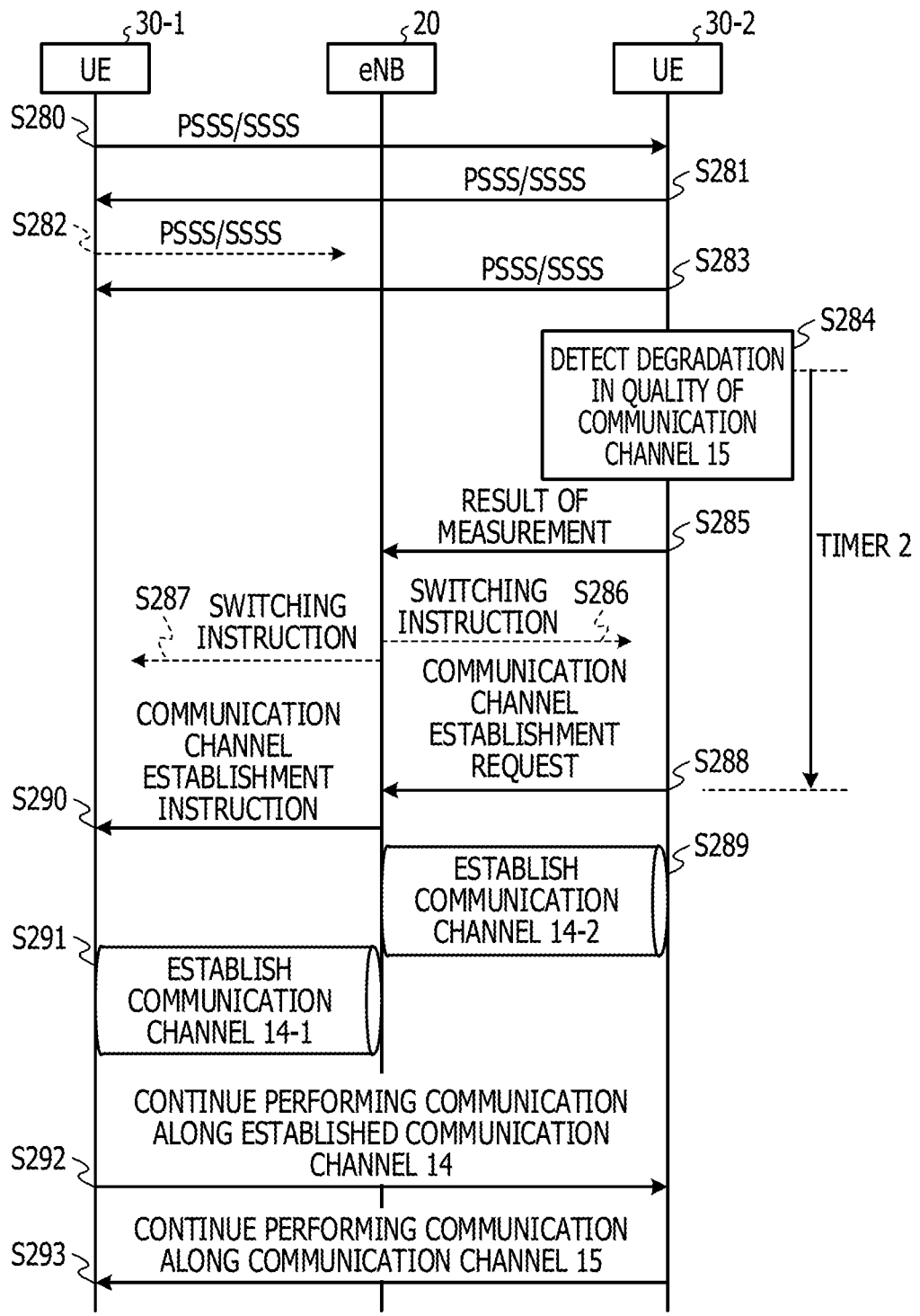
FIG. 14 is a sequence diagram illustrating an example of operation of the wireless communication system in the case where the quality of the communication channel in one direction is degraded and where the switching instruction is not received in any UE, in the fourth embodiment.

Operation of the Wireless Communication System 10 in the Case where the Quality of the Communication Channel 15 is Degraded and where the Switching Instruction is not Received Furthermore, due to the wireless situation of the communication channel 15, in some cases, the quality of the communication channel 15 in one direction is degraded and via with this, the switching instruction from the eNB 20 is not received in the UE 30. Operation of the wireless communication system 10 in such a situation will be described below. FIG. 14 is a sequence diagram illustrating an example of operation of the wireless communication system 10 in the case where the quality of the communication channel in one direction is degraded and where the switching instruction is not received, in the fourth embodiment. It is noted that, in an example that is illustrated in FIG. 14, the communication channel 14 and the communication channel 15 via which a signal is transmitted from the UE 30-1 to the UE 30-2, and the communication channel 14 and the communication channel 15 via which a signal is transmitted from the UE 30-2 to the UE 30-1 are separately managed.

First, the UE 30-1 and the UE 30-2 periodically transmit the synchronization frame 40 including the PSSS and the SSSS, via the communication channel 15 (S280 and S281). The UE 30-2 measures the quality of the communication channel 15 based on the reception quality of the synchronization frame 40 that is transmitted from the UE 30-1, and determines whether or not the measured quality of the communication channel 15 is poorer than the predetermined quality. In the example that is illustrated in FIG. 14, it is assumed that the quality of the communication channel 15 via which a signal is transmitted from the UE 30-1 to the UE 30-2 is degraded to a degree that is lower than the quality of the predetermined quality (S282), but that the quality of the communication channel 15 via which a signal is transmitted from the UE 30-2 to the UE 30-1 is better than the predetermined quality (S283).

The UE 30-2 detects that the quality of the communication channel 15 via which a signal is transmitted from the UE 30-1 to UE 30-2 is degraded to a degree that is lower than the predetermined quality, and thus detects the degradation in the quality of the communication channel 15 (S284). In the case where the degradation in the quality of the communication channel 15 is detected, the UE 30-2 causes the timer 2 to be reset for restarting. Then, the UE 30-2 transmits the result of the measurement of the quality of the communication channel 15 to the eNB 20 (S285). The eNB 20 receives the result of the measurement from the UE 30-2, but does not receive the result of the measurement from the UE 30-1. For this reason, the eNB 20 transmits the switching instruction that instructs the UE 30-2 to establish the communication channel 14-2 via which a signal is transmitted from the UE 30-1 to the UE 30-2, to the UE 30-2 (S286). Furthermore, the eNB 20 transmits the switching instruction that instructs the UE 30-1 to establish the communication channel 14-1 via which a signal is transmitted from the UE 30-1 to the UE 30-2, to the UE 30-1 (S287). However, the switching instruction that is transmitted from the eNB 20 is not received in any one of the UE 30-1 and the UE 30-2.

Even in a case the switch instruction from the eNB 20 is not received, if the timer 2 expires, the UE 30-2 transmits the communication channel establishment request that requests the establishment of the communication channel 14-2 via which a signal is transmitted from the UE 30-1 to UE 30-2, to the eNB 20 (S288). Then, the UE 30-2 establishes the communication channel 14-2 via which a signal is transmitted from the UE 30-1 to the UE 30-2, between the UE 30-2 itself and the eNB 20 (S289).

Next, the eNB 20 transmits the communication channel establishment instruction that instructs the UE 30-1 to establish the communication channel 14-1 via which a signal is transmitted from the UE 30-1 to the UE 30-2, to the UE 30-1 (S290). Then, the UE 30-1 establishes the communication channel 14-1 via which a signal is transmitted from the UE 30-1 to the UE 30-2, between the UE 30-1 itself and the eNB 20 (S291).

Then, each of the UE 30-1 and the UE 30-2 continues performing the communication from the UE 30-1 to the UE 30-2 via the communication channel 14 that is established between each of the UE 30-1 and the UE 30-2 themselves and the eNB 20 (S292). Specifically, the UE 30-1 transmits data, which is destined for the UE 30-2, via the communication channel 14-1 that is established between the UE 30-1 itself and the eNB 20, and the UE 30-2 receives the data from the UE 30-1 via the communication channel 14-2 that is established between the UE 30-2 itself and the eNB 20. Furthermore, the communication from the UE 30-2 to the UE 30-1 is continuously performed via the communication channel 15 that is already established between the UE 30-1 and the UE 30-2 (S293).

In this manner, even in the case where the switching instruction is not received from the eNB 20, if the state where the quality of the communication channel 15 is poorer than the predetermined quality continues for the predetermined time or longer, the UE 30 establishes the communication channel 14 between the UE 30 itself and the eNB 20. Then, the UE 30 causes the switching to occur from the wireless communication with one other piece of UE 30 via the communication channel 15 to the wireless communication via the communication channel 14. Accordingly, the UE 30 can suppress the occurrence of the interruption of the communication with one other piece of UE 30 due to the degradation in the quality of the communication channel 15.

Fifth Embodiment

Configuration of a Wireless Communication System 10

Figure 15:
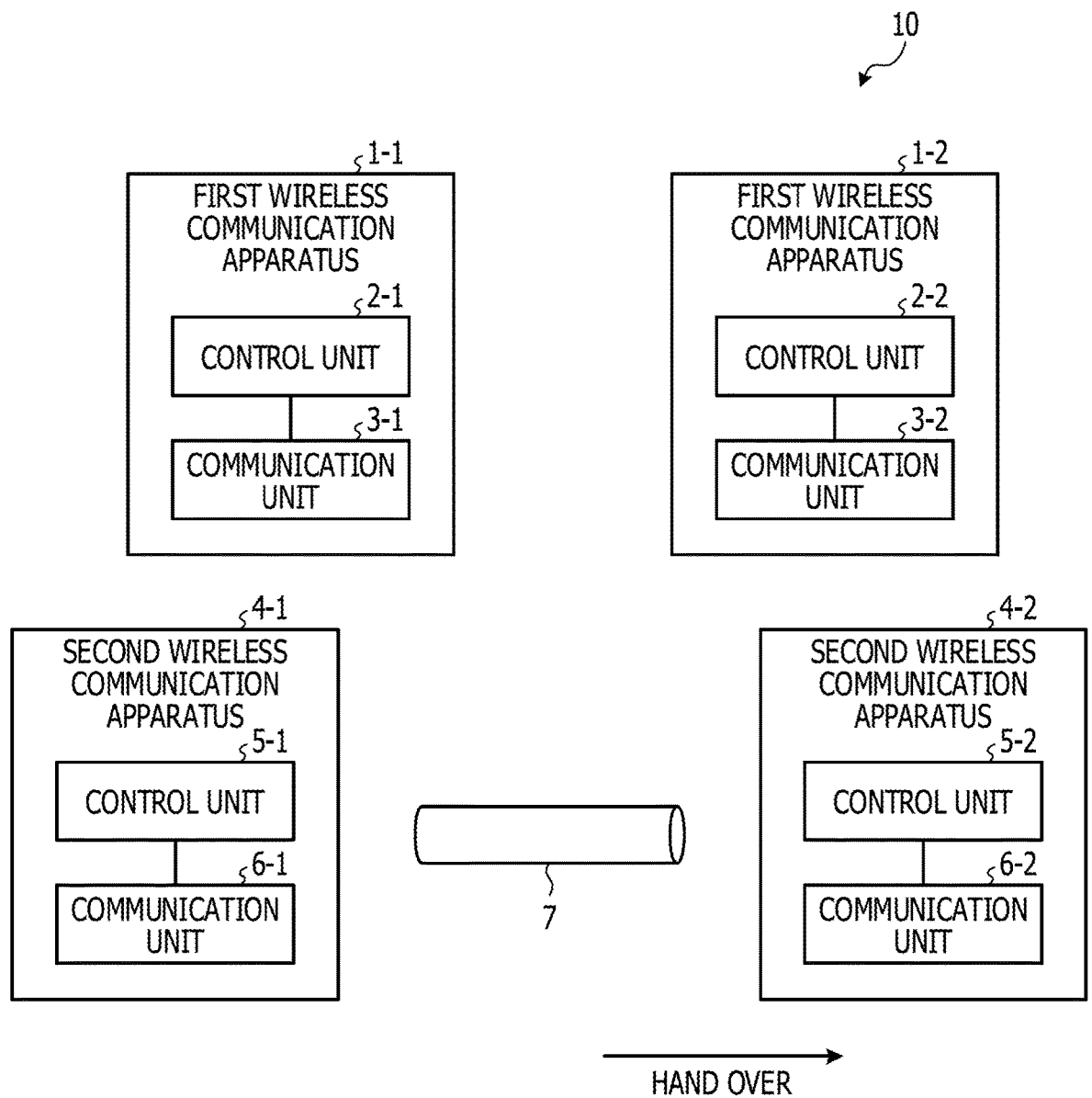
FIG. 15 is a diagram illustrating an example of a wireless communication system according to a fifth embodiment.

FIG. 15 is a diagram illustrating an example of a wireless communication system 10 according to a fifth embodiment. The wireless communication system 10 according to the fifth embodiment includes a plurality of first wireless communication apparatuses 1-1 and a plurality of first wireless communication apparatuses 1-2, and a plurality of second wireless communication apparatuses 4-1 and a plurality of second wireless communication apparatuses 4-2. The first wireless communication apparatus 1-1 has a control unit 2-1 and a communication unit 3-1. The first wireless communication apparatus 1-2 has a control unit 2-2 and a communication unit 3-2. The second wireless communication apparatus 4-1 has the control unit 5-1 and the communication unit 6-1. The second wireless communication apparatus 4-2 has the control unit 5-2 and the communication unit 6-2. The second wireless communication apparatuses 4-1 and 4-2 possibly perform communication through the first wireless communication apparatus 1-1 within a cell of the first wireless communication apparatus 1-1, and possibly perform communication through the first wireless communication apparatus 1-2 within a cell of the first wireless communication apparatus 1-2. Furthermore, the second wireless communication apparatuses 4-1 and 4-2 possibly perform communication via the first communication channel 7. The first communication channel 7, for example, is used for the D2D communication.

It is noted that, in a case where the first wireless communication apparatuses 1-1 and 1-2 are collectively referred to without being distinguished from each other, the first wireless communication apparatuses 1-1 and 1-2 will be described below as the first wireless communication apparatus 1. Furthermore, in a case where the control unit 2-1 and the control unit 2-2 are collectively referred to without being distinguished from each other, the control unit 2-1 and the control unit 2-2 will be collectively described below as the control unit 2, and in a case where the communication unit 3-1 and the communication unit 3-2 are collectively named without being distinguished from each other, the communication unit 3-1 and the communication unit 3-2 will be collectively described below as the communication unit 3.

In the present embodiment, first, the second wireless communication apparatuses 4-1 and 4-2 belong to the first wireless communication apparatus 1-1, and perform wireless communication via the first communication channel 7. Then, a handover occurs from the second wireless communication apparatus 4-2 to one other first wireless communication apparatus 1-2, and the second wireless communication apparatuses 4-1 and 4-2 updates a resource for the first communication channel 7, based on information on a resource that is allocated from the first wireless communication apparatus 1-2 that is a handover destination. Accordingly, communication between the second wireless communication apparatus 4-1 and the second wireless communication apparatus 4-2 is continuously performed via the first communication channel 7.

The communication unit 6 of each second wireless communication apparatus 4 possibly performs wireless communication between the first wireless communication apparatus 1 and one other second wireless communication apparatus 4. The communication unit 6 possibly performs the wireless communication via the first communication channel 7 between the second wireless communication apparatus 4 itself and the one other second wireless communication apparatus 4. In a case where the second wireless communication apparatus 4-2 performs a handover from the first wireless communication apparatus 1-1 to the first wireless communication apparatus 1-2, the control unit 5-2 of the second wireless communication apparatus 4-2 that performs the wireless communication via the first communication channel 7 between the second wireless communication apparatus 4-2 itself and the second wireless communication apparatus 4-1 receives information on a resource that is allocated by the first wireless communication apparatus 1-2, from the first wireless communication apparatus 1-1 or the first wireless communication apparatus 1-2. Furthermore, the control unit 5-1 of the second wireless communication apparatus 4-1 receives the information on the resource that is allocated by the first wireless communication apparatus 1-2 which is the handover destination of the second wireless communication apparatus 4-2, from the second wireless communication apparatus 4-2 or the first wireless communication apparatus 1-1. Then, the control unit 5-1 of the second wireless communication apparatus 4-1 and the control unit 5-2 of the second wireless communication apparatus 4-2 updates resources, such as frequency bands, that are used for the first communication channel 7, based on the received information on the resource. Accordingly, even in a case where the second wireless communication apparatus 4-2 performs a handover, the second wireless communication apparatus 4-1 and the second wireless communication apparatus 4-2 can continue performing the wireless communication via the first communication channel 7, the resource for which is updated, without contending for the source that is allocated by the first wireless communication apparatus 1-2 which is the handover destination.

At this point, several detailed examples of control that is performed by each of the first wireless communication apparatus 1 and the second wireless communication apparatus 4 will be given below. As the first example, in the case where the second wireless communication apparatus 4-2 performs a handover, the control unit 2-1 of the first wireless communication apparatus 1-1 receives the information on the resource that is allocated from the first wireless communication apparatus 1-2 that is the handover designation, from the first wireless communication apparatus 1-2 through the communication unit 3-1. Then, the control unit 2-1 transmits the information on the resource that is allocated from the first wireless communication apparatus 1-2, to the second wireless communication apparatus 4-2 through the communication unit 3-1.

The control unit 5-2 of the second wireless communication apparatus 4-2 receives the information on the resource that is allocated from the first wireless communication apparatus 1-2 that is the handover destination, from the first wireless communication apparatus 1-1 through the communication unit 6-2. Then, the control unit 5-2 transmits information on a resource, which is received from the first wireless communication apparatus 1-1, to the second wireless communication apparatus 4-1 via the first communication channel 7, using the communication unit 6-2. Then, the control unit 5-2 updates the resource that is used for the first communication channel 7, based on the information on the resource, which is received from the first wireless communication apparatus 1-1. In a case where the information on the resource is received from the second wireless communication apparatus 4-2 via the first communication channel 7 and through the communication unit 6-1, the control unit 5-1 of the second wireless communication apparatus 4-1 updates the resource that is used for the first communication channel 7, based on the received information on the resource. Accordingly, even in the case where the second wireless communication apparatus 4-2 performs a handover, the second wireless communication apparatus 4-1 and the second wireless communication apparatus 4-2 can continue performing the D2D communication via the first communication channel 7, the resource for which is updated, without contending for the resource that is allocated by the first wireless communication apparatus 1-2 which is the handover destination.

Furthermore, as the second example, in the case where the second wireless communication apparatus 4-2 performs a handover, the control unit 2-1 of the first wireless communication apparatus 1-1 receives the information on the resource that is allocated from the first wireless communication apparatus 1-2 that is the handover designation, from the first wireless communication apparatus 1-2 through the communication unit 3-1. Then, the control unit 2-1 transmits the information on the resource that is allocated from the first wireless communication apparatus 1-2, to each of the second wireless communication apparatus 4-1 and the second wireless communication apparatus 4-2 through the communication unit 3-1.

The control unit 5-1 of the second wireless communication apparatus 4-1 receives the information on the resource that is allocated by the first wireless communication apparatus 1-2 which is the handover destination, from the first wireless communication apparatus 1-1 through the communication unit 6-1, and, based on the received information on the resource, updates the resource that is used for the first communication channel 7. The control unit 5-2 of the second wireless communication apparatus 4-2 receives the information on the resource that is allocated by the first wireless communication apparatus 1-2 which is the handover destination, from the first wireless communication apparatus 1-1 through the communication unit 6-2, and, based on the received information on the resource, updates the resource that is used from the first communication channel 7.

Accordingly, even in the case where the second wireless communication apparatus 4-2 performs a handover, the second wireless communication apparatus 4-1 and the second wireless communication apparatus 4-2 can continue performing the D2D communication via the first communication channel 7, the resource for which is updated. Furthermore, the first wireless communication apparatus 1-1 transmits the information on the resource that is allocated from the first wireless communication apparatus 1-2 that is the handover destination, to each of the second wireless communication apparatus 4-1 and the second wireless communication apparatus 4-2. For this reason, the second wireless communication apparatus 4-1 and the second wireless communication apparatus 4-2 can receive the information on the resource that is allocated from the first wireless communication apparatus 1-2 which is the handover destination, with high reliability.

Furthermore, as the third example, in the case where the second wireless communication apparatus 4-2 performs a handover, the control unit 2-1 of the first wireless communication apparatus 1-1 receives the information on the resource that is allocated from the first wireless communication apparatus 1-2 which is the handover designation, from the first wireless communication apparatus 1-2 through the communication unit 3-1. Then, the control unit 2-1 transmits the information on the resource, which is received from the first wireless communication apparatus 1-2, to the second wireless communication apparatus 4-1 through the communication unit 3-1. Furthermore, in a case where the second wireless communication apparatus 4-2 finishes performing the handover, the control unit 2-2 of the first wireless communication apparatus 1-2 transmits the information on the resource to the second wireless communication apparatus 4-2 through the communication unit 3-2.

Based on the information on the resource, which is received from the first wireless communication apparatus 1-1, the control unit 5-1 of the second wireless communication apparatus 4-1 updates the resource that is used for the first communication channel 7, through the communication unit 6-1. Based on the information on the resource, which is received from the first wireless communication apparatus 1-2 that is the handover destination, the control unit 5-2 of the second wireless communication apparatus 4-2 updates the resource that is used for the first communication channel 7, through the communication unit 6-2. Accordingly, even in the case where the second wireless communication apparatus 4-2 performs a handover, the second wireless communication apparatus 4-1 and the second wireless communication apparatus 4-2 can continue performing the D2D communication via the first communication channel 7, the resource for which is updated. Furthermore, the information on the resource that is allocated by the first wireless communication apparatus 1-2 which is a handover source is transmitted from the first wireless communication apparatus 1-1 to the second wireless communication apparatus 4-1, and is transmitted from the first wireless communication apparatus 1-2 that is handover destination, to the second wireless communication apparatus 4-2. Accordingly, a processing load on each first wireless communication apparatus 1, which results when the information on the resource is transmitted to each wireless communication apparatus 4 can be distributed.

Sixth Embodiment

Configuration of a Wireless Communication System 10

Figure 16:
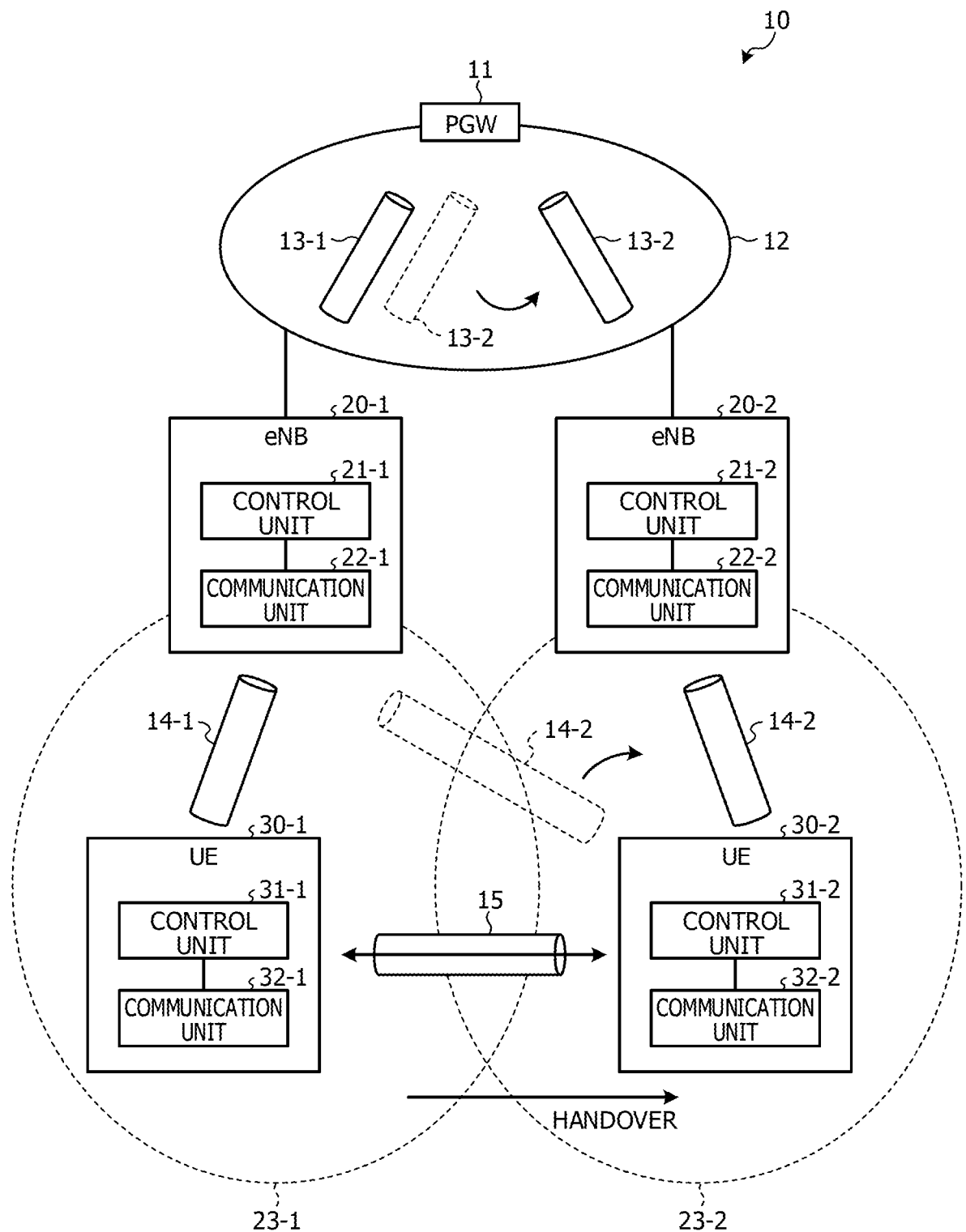
FIG. 16 is a diagram illustrating an example of a wireless communication system according to a sixth embodiment.

FIG. 16 is a diagram illustrating an example of a wireless communication system 10 according to a sixth embodiment. The sixth embodiment is equivalent to an embodiment that is more specific in concept than the fifth embodiment. The wireless communication system 10 according to the sixth embodiment includes an eNB 20-1, an eNB 20-2, the UE 30-1, and the UE 30-2. The eNB 20-1 has a control unit 21-1 and a communication unit 22-1. The eNB 20-2 has a control unit 21-2 and a communication unit 22-2. The UE 30-1 has the control unit 31-1 and the communication unit 32-1. The UE 30-2 has a control unit 31-2 and a communication unit 32-2. The UE 30-1 and the UE 30-2 possibly perform the D2D communication via the communication channel 15. The communication channel 15 is also referred to as an SLRB. Furthermore, the UE 30-1 possibly performs the cellular communication with the eNB 20-1 via the communication channel 14-1 between the UE 30-1 itself and the eNB 20-1, and the UE 30-2 possibly performs the cellular communication with the communication channel 14-2 between the UE 30-2 itself and the eNB 20-1 or the eNB 20-2.

It is noted that, in a case where the eNB 20-1 and the eNB 20-2 are collectively referred to without being distinguished from each other, the eNB 20-1 and the eNB 20-2 are collectively expressed as the eNB 20. Furthermore, in a case where the control unit 21-1 and the control unit 21-2 are collectively referred to without being distinguished from each other, the control unit 21-1 and the control unit 21-2 will be collectively described below as the control unit 21, and, in a case where the communication units 22-1 and 22-2 are collectively named without being distinguished from each other, the communication units 22-1 and 22-2 will be collectively described below as the communication unit 22. The eNB 20 is an example of a base station, and the UE 30 is an example of a terminal or a mobile station. Furthermore, the eNB 20 is an example of the first wireless communication apparatus 1 according to the fifth embodiment, and the UE 30 is an example of the second wireless communication apparatus 4 according to the fifth embodiment. Furthermore, the communication channel 15 is an example of the first communication channel 7 according to the fifth embodiment.

The eNB 20-1 and the eNB 20-2 are connected to the core network 12 such as an EPC. For the initial access from the UE 30, the eNB 20-1 establishes the communication channel 14 between the eNB 20-1 itself and the UE 30 within a cell 23-1 and establishes the communication channel 13 between the eNB 20-1 itself and the PGW 11 on the core network 12. For example, a default bearer is included in, and an individual bearer, as occasion demands, is added to the communication channel 14 and the communication channel 13. In an example in FIG. 16, the communication channel 13-1 and the communication channel 14-1 are established between the UE 30-1 and the PGW 11, and the communication channel 13-2 and the communication channel 14-2 are established between the UE 30-2 and the PGW 11. Then, in a case where the UE 30-2 moves within a cell 23-2 of the eNB 20-2, the UE 30-2 performs a handover to the eNB 20-2. At this time, the communication channel 13-2 and the communication channel 14-2 between the UE 30-2 and the PGW 11, as illustrated in FIG. 16, is switched from a channel that passes the eNB 20-1 to a channel that passes the eNB 20-2. It is noted that, in a case where data communication is not performed between the eNB 20 and the UE 30 for a predetermined period of time, the communication channel 14 between the eNB 20 and the UE 30 is released, but the communication channel 13 between the eNB 20 and the PGW 11 is maintained.

In a case where the UE 30-2 performs a handover from the eNB 20-1 to the eNB 20-2, the control unit 21-2 of the eNB 20-2 that is the handover destination creates the information on the resource, which allocates a resource, such as a frequency, for the communication channel 15 that is used for the D2D communication. Then, the control unit 21-2 transmits the created information on the resource to the eNB 20-1 that is the handover source, through the communication unit 22-2.

In a case where the information on the resource is received from the eNB 20-2 that is the handover destination, through the communication unit 22-1, the control unit 21-1 of the eNB 20-1 transmits the received information on the resource to the UE 30-2 that performs the handover.

In the case where one other piece of UE 30 that is a communication partner is detected, the control unit 31 of the UE 30 controls the communication unit 32 and thus establishes the communication channel 15 between the UE 30 itself and the one other piece of UE 30. For example, based on the information on the resource that is allocated from the eNB 20, the control unit 31 establishes the communication channel 15. Then, the control unit 31 of the UE 30 controls the communication unit 32 and thus performs the D2D communication with the one other piece of UE 30 via the established communication channel 15.

Furthermore, the control unit 31-2 of the UE 30-2 that performs the handover from the eNB 20-1 to the eNB 20-2 receives the information on the resource that is allocated by the eNB 20-2 which is the handover destination, from the eNB 20-1 that is the handover source, through the communication unit 32-2. Then, the control unit 31-2 controls the communication unit 32-2 and thus transmits the information on the resource, which is received from the eNB 20-1, to the UE 30-1 through the communication channel 15. Then, based on the information on the resource, which is received from the eNB 20-1, the control unit 31-2 updates the resource that is used for the communication channel 15. Specifically, the control unit 31-2 controls the communication unit 32-2, and thus transmits a signal to the UE 30-1 via the communication channel 15 that uses a resource that is allocated from the eNB 20-2 and receives a signal from the UE 30-1 via the communication channel 15 that uses a resource which is allocated from the eNB 20-2.

Furthermore, the control unit 31-1 of the UE 30-1 that performs the D2D communication with the UE 30-2 that performs the handover, via the communication channel 15 receives the information on the resource from the UE 30-2 via the communication channel 15 and the communication unit 32-1. Then, based on the information on the resource, which is received from the UE 30-2, the control unit 31-1 updates the resource that is used for the communication channel 15. Accordingly, the UE 30-1 and the UE 30-2 can continue performing the D2D communication via the communication channel 15, the resource for which is updated based on the information on the resource that is allocated from the eNB 20-2 which is the handover destination.

Operation of the Wireless Communication System 10

Figure 17:
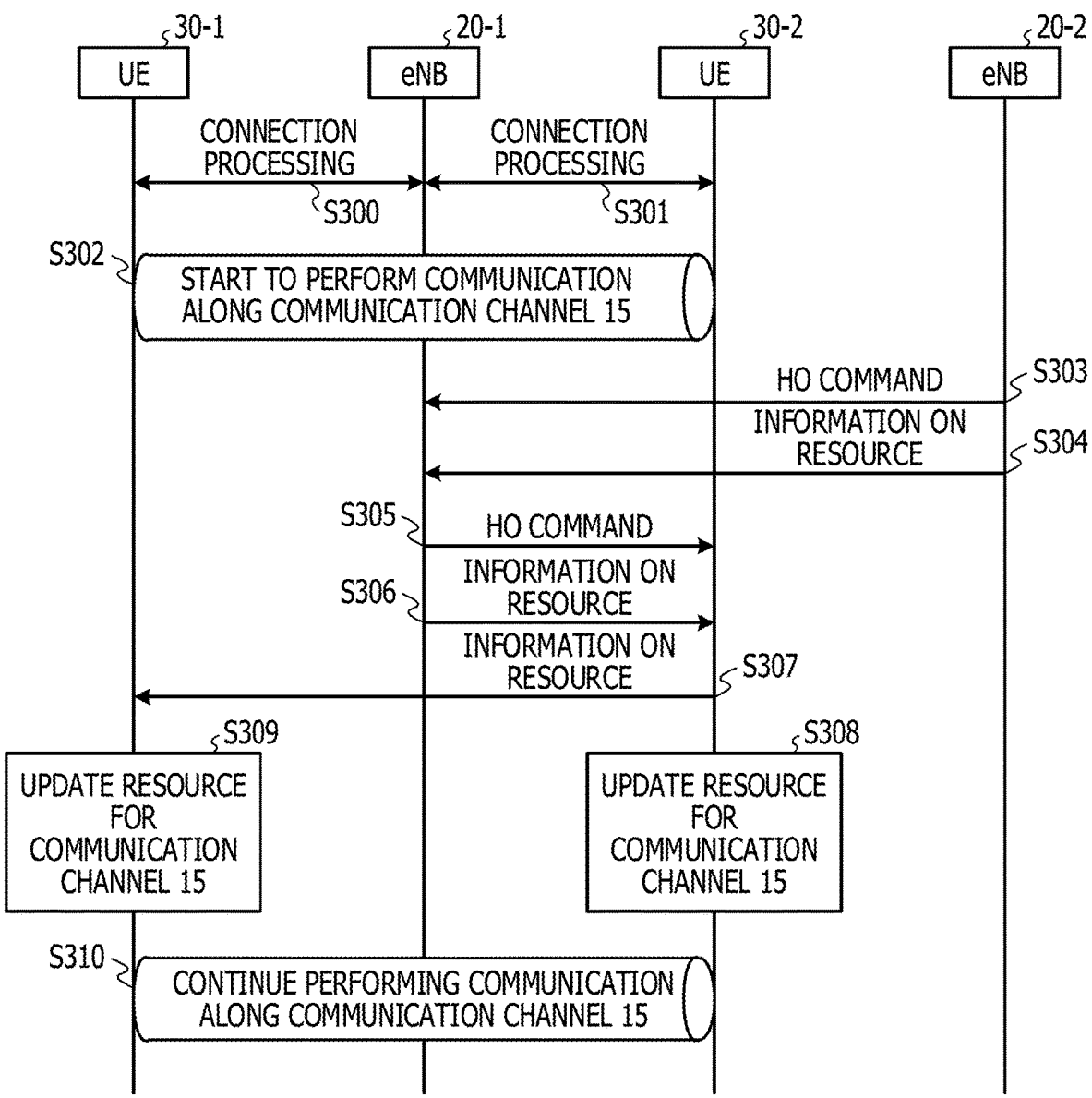
FIG. 17 is a sequence diagram illustrating an example of operation of the wireless communication system according to the sixth embodiment.

FIG. 17 is a sequence diagram illustrating an example of operation of the wireless communication system 10 according to the sixth embodiment.

First, the UE 30-1 and the UE 30-2 perform processing for connection to the eNB 20-1, and proceed to the connected node (S300 and S301). Then, the UE 30-1 and the UE 30-2 establish the communication channel 15 and start to perform the D2D communication with each other via the communication channel 15 (S302).

Next, when the UE 30-2 starts to perform processing for the handover from the eNB 20-1 to the eNB 20-2, a handover (HO) command is transmitted from the eNB 20-2 that is the handover destination, to the eNB 20-1 that is the handover source (S303). Furthermore, the eNB 20-2 that is the handover destination creates the information on the resource that allocates a resource that is used for the communication channel 15, and transmits the created information on the resource to the eNB 20-1 that is the handover source (S304). The eNB 20-1 that is the handover source transmits the HO command and the information on the resource, which are received from the eNB 20-2 that is the handover destination, to the UE 30-2 (S305 and S306).

Next, the UE 30-2 transmits the information on the resource, which is received from the eNB 20-1 that is the handover source, to the UE 30-1 via the communication channel 15 (S307). Then, based on the information on the resource, which is received from the eNB 20-1 that is the handover source, the UE 30-2 updates the resource that is used for the communication channel 15 (S308). Furthermore, based on the information on the resource, which is received from the UE 30-2, the UE 30-1 updates the resource that is used for the communication channel 15 (S309). Then, the UE 30-1 and the UE 30-2 continue performing the D2D communication via the communication channel 15, the resource for which is updated (S310).

In this manner, in a case where the UE 30-2 that performs the D2D communication via the communication channel 15 performs a handover, the eNB 20-1 that is the handover source transmits the information on the resource that is allocated from the eNB 20-2 which is the handover destination, to the UE 30-2 that performs the handover. Then, the UE 30-2 transmits the information on the resource, which is received from the eNB 20-1 that is the handover source, to the UE 30-1 that performs the D2D communication via the communication channel 15. Then, based on the information on the resource, each of the UE 30-1 and the UE 30-2 updates the resource that is used for the communication channel 15. Accordingly, even in a case where any one of the pieces of UE 30 that perform the D2D communication via the communication channel 15 performs a handover, the UE 30 can continue performing the D2D communication via the communication channel 15, the resource for which is updated, without contending for the resource that is allocated by the eNB 20 which is the handover destination.

Seventh Embodiment

In a seventh embodiment, the eNB 20-1 that is the handover source transmits the information on the resource that is allocated from the eNB 20-2 which is the handover destination, to each of the UE 30-1 and the UE 30-2. A configuration of a wireless communication system 10 according to the present embodiment is the same as that of the wireless communication system 10 according to the sixth embodiment, which is described with reference to FIG. 16, and thus a detailed description thereof is omitted. The seventh embodiment is equivalent to an embodiment that is more specific in concept than the fifth embodiment.

Operation of the Wireless Communication System 10

Figure 18:
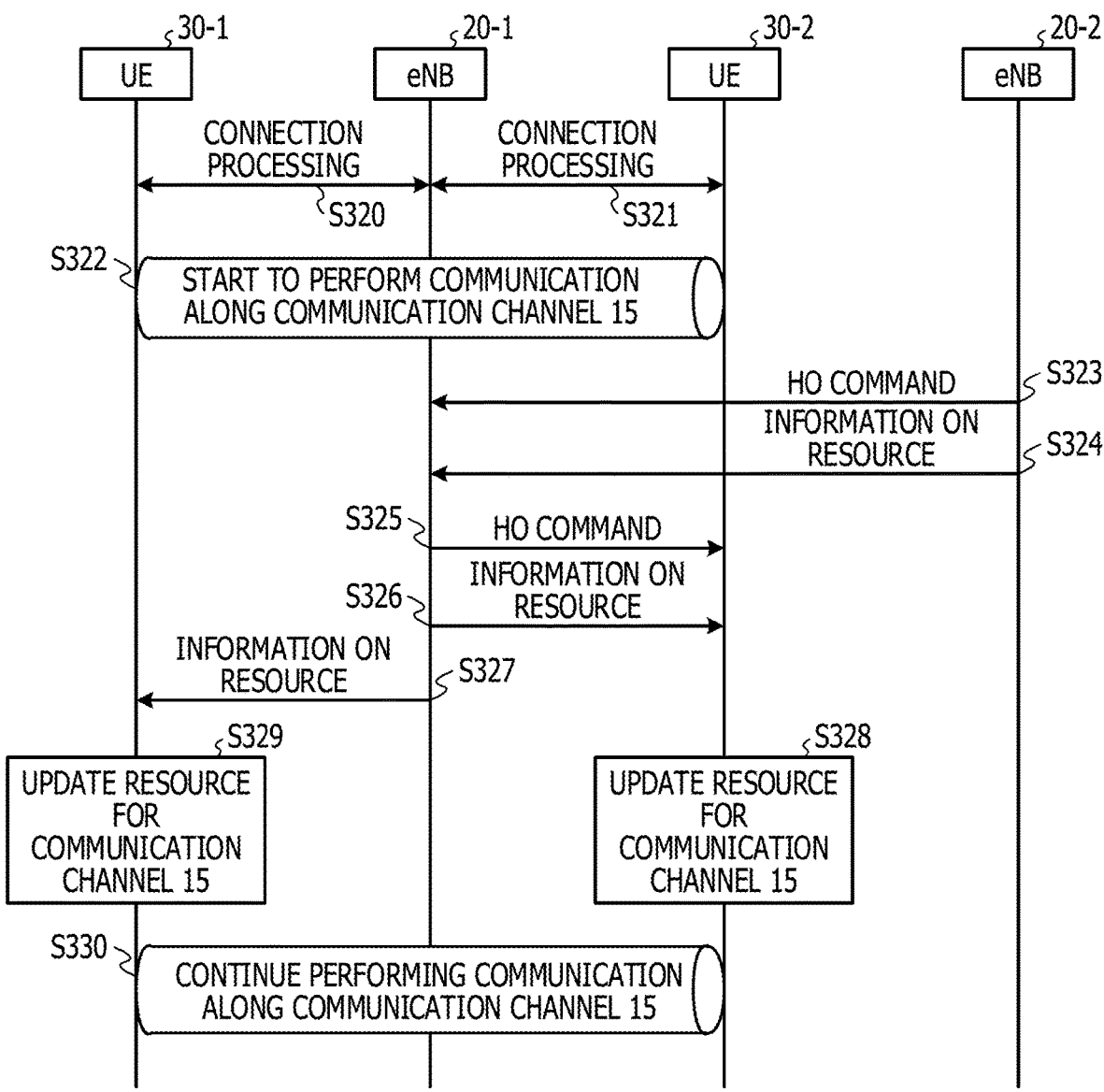
FIG. 18 is a sequence diagram illustrating an example of operation of a wireless communication system according to a seventh embodiment.

FIG. 18 is a sequence diagram illustrating an example of operation of the wireless communication system 10 according to the seventh embodiment.

First, the UE 30-1 and the UE 30-2 perform processing for connection to the eNB 20-1, and proceed to the connection mode (S320 and S321). Then, the UE 30-1 and the UE 30-2 establish the communication channel 15 and start to perform the D2D communication with each other via the communication channel 15 (S322).

Next, when the UE 30-2 starts to perform the handover from the eNB 20-1 to the eNB 20-2, the HD command is transmitted from the eNB 20-2 that is the handover destination, to the eNB 20-1 that is the handover source (S323). Furthermore, the eNB 20-2 that is the handover destination transmits the information on the resource that allocates the resource that is used for the communication channel 15, to the eNB 20-1 that is the handover source (S324). The eNB 20-1 that is the handover source transmits the HO command that is received from the eNB 20-2 that is the handover destination, to the UE 30-2 (S325). Then, the eNB 20-1 that is the handover source transmits the information on the resource, which is received from the eNB 20-2 that is the handover destination, to the UE 30-1 and the UE 30-2 (S326 and S327).

Next, based on the information on the resource, which is received from the eNB 20-1 that is the handover source, each of the UE 30-1 and the UE 30-2 updates the resource that is used for the communication channel 15 (S328 and S329). Then, the UE 30-1 and the UE 30-2 continue performing the D2D communication via the communication channel 15, the resource for which is updated (S330).

In this manner, in the case where the UE 30-2 that performs the D2D communication via the communication channel 15 performs a handover, the eNB 20-1 that is the handover source transmits the information on the resource that is allocated from the eNB 20-2 which is the handover destination, to each of the UE 30-1 and the UE 30-2. Then, based on the information on the resource, each of the UE 30-1 and the UE 30-2 updates the resource that is used for the communication channel 15. Accordingly, even in the case where any one of the pieces of UE 30 that perform the D2D communication via the communication channel 15 performs a handover, the UE 30 can continue performing the D2D communication via the communication channel 15, the resource for which is updated, without contending for the resource that is allocated by the eNB 20 which is the handover destination. Furthermore, because the eNB 20-1 that is the handover source transmits to each of the UE 30-1 and the UE 30-2, the UE 30-1 and the UE 30-2 can receive the information on the resource that is allocated from the eNB 20-2 that is the handover destination, with high reliability.

Eighth Embodiment

In an eighth embodiment, the eNB 20-1 that is the handover source transmits the information on the resource that is allocated from the eNB 20-2 which is the handover destination, to the UE 30-1, and the eNB 20-2 that is the handover destination transmits the information on the resource, to the UE 30-2 that performs the handover. A configuration of a wireless communication system 10 according to the present embodiment is the same as that of the wireless communication system 10 according to the sixth embodiment, which is described with reference to FIG. 16, and thus a detailed description thereof is omitted. The eighth embodiment is equivalent to an embodiment that is more specific in concept than the fifth embodiment.

Operation of the Wireless Communication System 10

Figure 19:
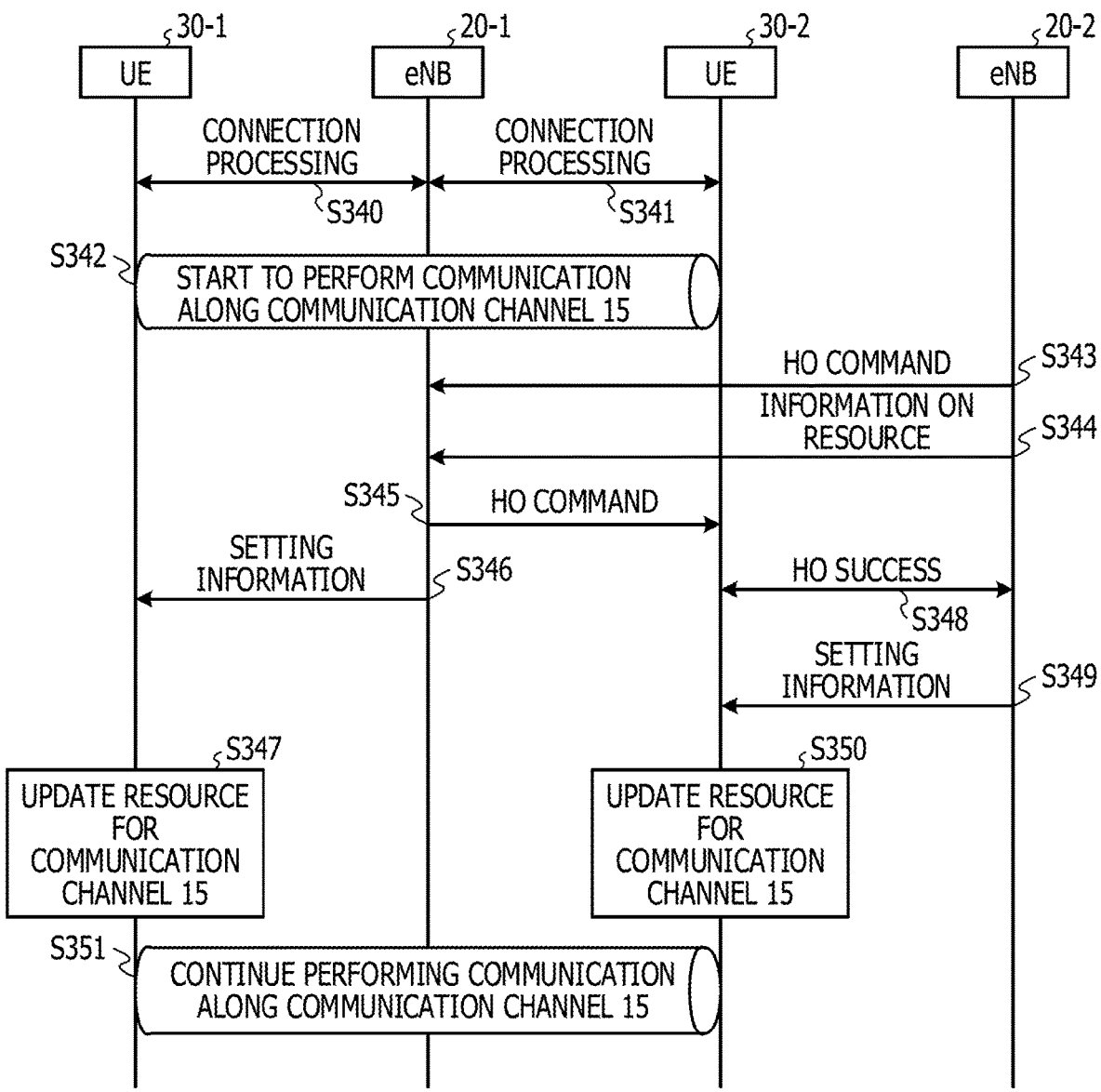
FIG. 19 is a sequence diagram illustrating an example of operation of a wireless communication system according to an eighth embodiment.

FIG. 19 is a sequence diagram illustrating an example of operation of the wireless communication system 10 according to the eighth embodiment.

First, the UE 30-1 and the UE 30-2 perform the processing the connection to the eNB 20-1 and the eNB 20-1, and proceed to the connection node (S340 and S341). Then, the UE 30-1 and the UE 30-2 establish the communication channel 15 and start to perform the D2D communication with each other via the communication channel 15 (S342).

Next, when the UE 30-2 starts to perform the handover from the eNB 20-1 to the eNB 20-2, the HD command is transmitted from the eNB 20-2 that is the handover destination, to the eNB 20-1 that is the handover source (S343). Furthermore, the eNB 20-2 that is the handover destination creates the information on the resource that allocates the resource that is used for the communication channel 15, and transmits the created information on the resource to the eNB 20-1 that is the handover source (S344). The eNB 20-1 that is the handover source transmits the HO command that is received from the eNB 20-2 that is the handover destination, to the UE 30-2 (S345). Then, the eNB 20-1 that is the handover source transmits the information on the resource, which is received from the eNB 20-2 that is the handover destination, to the UE 30-1 and the UE 30-2 (S346). Based on the information on the resource, which is received from the eNB 20-1 that is the handover source, the UE 30-1 updates the resource that is used for the communication channel 15 (S347).

Furthermore, in a case where the performing of the handover is finished (S348), the eNB 20-2 that is the handover destination transmits the information on the resource that is used for the communication channel 15, to the UE 30-2 (S349). Based on the information on the resource, which is received from the eNB 20-2 that is the handover source, the UE 30-2 that performs the handover updates the resource that is used for the communication channel 15 (S350). Then, the UE 30-1 and the UE 30-2 continue performing the D2D communication via the communication channel 15, the resource for which is updated (S351).

In this manner, in the case where the UE 30-2 that performs the D2D communication via the communication channel 15 performs a handover, the eNB 20-1 that is the handover source transmits the information on the resource that is allocated from the eNB 20-2 which is the handover destination, to the UE 30-1. Furthermore, the eNB 20-2 that is the handover destination transmits the information on the resource, to the UE 30-2 that performs the handover. Then, based on the information on the resource, each of the UE 30-1 and the UE 30-2 updates the resource that is used for the communication channel 15. Accordingly, even in the case where any one of the pieces of UE 30 that perform the D2D communication via the communication channel 15 performs a handover, the UE 30 can continue performing the D2D communication via the communication channel 15, the resource for which is updated, without contending for the resource that is allocated by the eNB 20 which is the handover destination. Furthermore, the information on the resource that is allocated by the eNB 20-2 which is the handover destination is transmitted from the eNB 20-1 that is the handover source to the UE 30-1, and is transmitted from the eNB 20-2 that is the handover destination to the UE 30-2. Accordingly, the processing load on the eNB 20 that results when the resource information is transmitted to the UE 30 can be distributed.

Ninth Embodiment

A ninth embodiment is an embodiment relating to a combination of the first embodiment and the fifth embodiment. A configuration of a wireless communication system 10 according to the ninth embodiment is the same as that of the wireless communication system 10 that is described with reference to FIG. 1 or 15, and thus a description thereof is omitted.

In the present embodiment, in a case where wireless communication is performed via the first communication channel 7, if the degradation in the quality of the first communication channel 7 is detected, each second wireless communication apparatus 4 establishes the second communication channel 8 between the second wireless communication apparatus 4 itself and the first wireless communication apparatus 1 in the same manner as in the first embodiment. Then, each second wireless communication apparatus 4 cause the switching to occurs from the wireless communication via the first communication channel 7 to the wireless communication via the second communication channel 8. Furthermore, in the case where the wireless communication is performed via the first communication channel 7, when any second wireless communication apparatus 4 performs a handover, each second wireless communication apparatus 4 updates the resource for the first communication channel 7 based on the information on the resource that is allocated from the first wireless communication apparatus 1 which is the handover destination, in the same manner as in the fifth embodiment. Accordingly, even in a case where the quality of the first communication channel 7 is degraded, or in a case where the second wireless communication apparatus 4 performs a handover, the wireless communication system 10 can suppress the occurrence of the interruption of the communication with the second wireless communication apparatus 4.

It is noted that the second to fourth embodiments are embodiments that are more specific in concept than the first embodiment, and the sixth to eighth embodiments are embodiments that are more specific in concept than the fifth embodiment. For this reason, as in the ninth embodiment that results from combining the first embodiment and the fifth embodiment, combinations of the second to fourth embodiments and the sixth to eighth embodiments, respectively, are possible.

Hardware

Figure 20:
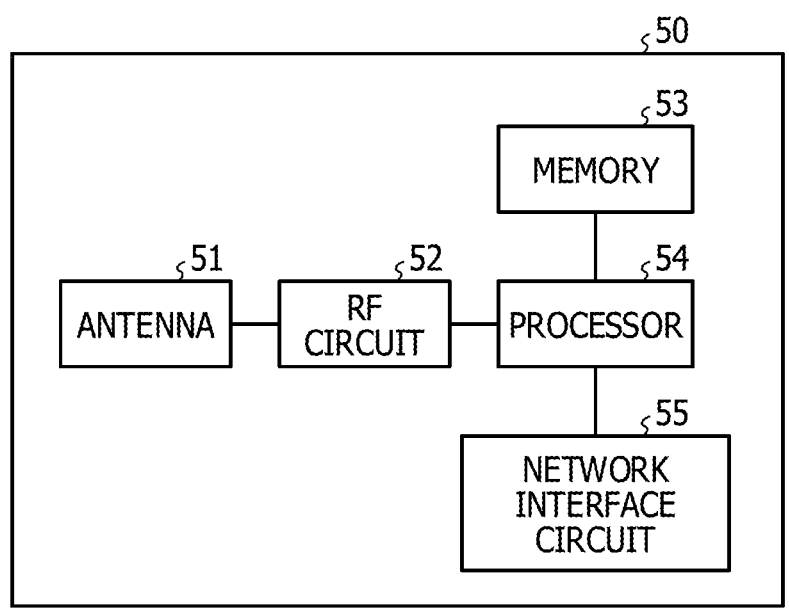
FIG. 20 is a diagram illustrating an example of first wireless communication apparatuses that are described in the first to ninth embodiments and of a communication apparatus that realizes a function of an eNB.

FIG. 20 is a diagram illustrating an example of the first wireless communication apparatuses that are described in the first to ninth embodiments or of a communication apparatus 50 that realizes a function of the eNB 20. For example, the communication apparatus 50, as illustrated in FIG. 20, has an antenna 51, an RF circuit 52, a memory 53, a processor 54, and a network interface circuit 55.

The RF circuit 52 performs predetermined processing, such as modulation, on a signal that is output from the processor 54, and transmits the post-processing signal through the antenna 51. Furthermore, the RF circuit 52 performs the predetermined processing, such as the modulation, on the signal that is received through the antenna 51, and outputs the resulting signal to the processor 54. The processor 54, for example, realizes functions of the control unit 2 of the first wireless communication apparatus 1 and the control unit 21 of the eNB 20. The network interface circuit 55 is an interface for connecting to the core network 12 using a wired connection, or one other communication apparatus 50.

The RF circuit 52, the memory 53, and the processor 54, for example, realize the communication unit 3 of the first wireless communication apparatus 1 and the communication unit 22 of the eNB 20. For example, various programs or the like for realizing the function of the communication unit 3 or the communication unit 22 are stored in the memory 53. Then, the processor 54 performs a program that is read from the memory 53, and realizes the function of the communication unit 3 or the communication unit 22 in cooperation with the RF circuit 52 or the like.

Figure 21:
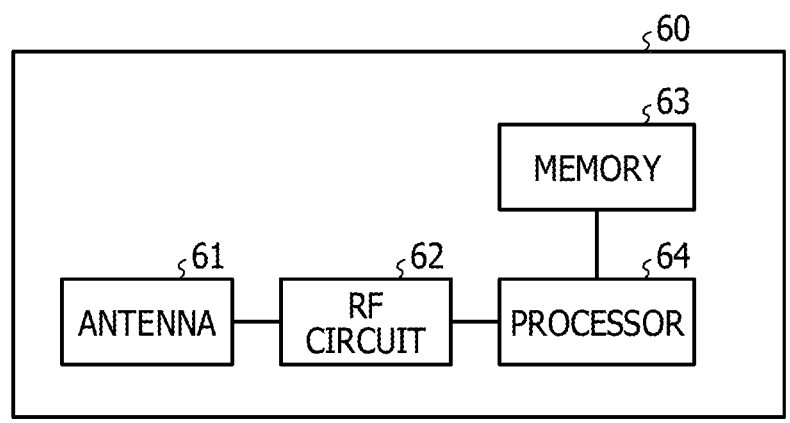
FIG. 21 is a diagram illustrating an example of a communication apparatus that realizes a function of a second wireless communication apparatus or UE that is described in the first to ninth embodiments.

FIG. 21 is a diagram illustrating an example of a communication apparatus 60 that realizes a function of the second wireless communication apparatus 4 or the UE 30 that is described in the first to ninth embodiments. For example, the communication apparatus 60, as illustrated in FIG. 21, has an antenna 61, an RF circuit 62, a memory 63, and a processor 64.

The RF circuit 62 performs predetermined processing, such as modulation, on a signal that is output from the processor 64, and transmits the post-processing signal through the antenna 61. Furthermore, the RF circuit 62 performs the predetermined processing, such as the modulation, on the signal that is received through the antenna 61, and outputs the resulting signal to the processor 64. The processor 64, for example, realizes functions of the control unit 5 of the second wireless communication apparatus 4 and the control unit 31 of the UE 30.

The RF circuit 62, the memory 63, and the processor 64, for example, realize functions of the communication unit 6 of the second wireless communication apparatus 4 and the communication unit 32 of the UE 30. For example, various programs or the like for realizing the function of the communication unit 6 or the communication unit 32 are stored in the memory 63. Then, the processor 64 performs a program that is read from the memory 63, and realizes the function of the communication unit 6 or the communication unit 32 in cooperation with the RF circuit 62 or the like.

Others

It is noted that the disclosed technology is not limited to each of the embodiments described above, and that many modifications thereto are possible within the scope that does not depart from the gist thereof.

For example, in the third embodiment described above, in a case where the quality of the communication channel 15 that is used for the D2D communication is degraded to a degree that is lower than a predetermined quality, the UE 30 transmits the switching instruction to one other piece of UE 30 in communication via the communication channel 15, but the disclosed technology is not limited to this. For example, in the case where the quality of the communication channel 15 is degraded to a degree that is lower than the predetermined quality, the UE 30 may stop the transmission of the synchronization frame 40 that is periodically transmitted via the communication channel 15. Accordingly, the one other piece of UE 30 in communication via the communication channel 15 detects the degradation in the quality of the communication channel 15 due to a failure in the reception of the synchronization frame 40, and establishes the communication channel 14 between the one other piece of UE 30 itself and the eNB 20. Accordingly, the UE 30 can cause the switching to occur from the wireless communication via the communication channel 15 to the wireless communication via the communication channel 14 that is established between the UE 30 itself and the eNB 20.

Furthermore, in the second to fourth embodiments described above, for example, RRC connection re-establishment that is the RRC signal is used for the communication channel establishment request that is transmitted from the UE 30 to the eNB 20. Furthermore, any other signal that is used at Layer 2 or Layer 3 of the OSI reference model may be used as the communication channel establishment request. It is noted that, even in the case of the existing cellular system, the RRC connection reestablishment is used. For this reason, in a case where the RRC connection re-establishment is used for the communication channel establishment request, it is preferable that information which distinguishes between an RLF in the communication channel 14 between the eNB 20 and the UE 30, and an RLF in the communication channel 15 between the pieces of UE 30 themselves is added to the RRC connection re-establishment. The RLF is an acronym for radio link failure. The information that is added to the RRC connection re-establishment, for example, may be a one-bit flag. Furthermore, in order to provide a distinction from an existing RRC connection re-establishment, a new message such as the RRC D2D connection re-establishment may be defined as a signal that is used for the communication channel establishment request.

Furthermore, in the second to fourth embodiments described above, for example, an RRC connection reconfiguration that does not include MobilityControlInfo, which is the RRC signal, may be used for the communication channel establishment instruction that is transmitted from the eNB 20 to the UE 30. Furthermore, for example, an RRC connection reconfiguration that does not include MobilityControlInfo, which is the RRC signal, may be used for the switching instruction that is transmitted in the third or fourth embodiment described above. It is noted that any other signal that is used at Layer 2 or Layer 3 of the OSI reference model may be used as the communication channel establishment instruction or the switching instruction.

Furthermore, in the sixth to eighth embodiments described above, the information on the resource that is allocated from the eNB 20-2 which is the handover destination may be transmitted using an RRC connection reconfiguration that includes MobilityControlInfo, which is the RRC signal. It is noted that a signal that is used for the transmission of the information on the resource may be any other signal that is used at Layer 2 or Layer 3 of the OSI reference mode.

Furthermore, the communication channel establishment request, the communication channel establishment instruction, and the switching instruction may be transmitted using a channel that is newly defined for a physical layer.

All examples and conditional language recited herein of the RFID tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A User Equipment (UE) comprising:
   a communication circuit configured to perform wireless communication via a first communication channel to transmit data between the UE and a first UE without passing through a source base station, and wireless communication via a second communication channel between the UE and the source base station; and
   a control circuit configured to execute first processing when a signal of a radio resource control (RRC) layer is received from the source base station, the first processing including controlling the communication circuit to perform switching processing of the second communication channel, and controlling the communication circuit to perform a wireless communication via the first communication channel by using a radio resource information included in a RRC connection reconfiguration message including a mobility control information, the RRC connection reconfiguration message being included in the received signal of the RRC layer, wherein the first processing further includes establishing communication with the first UE via a third communication channel using the radio resource information included in the RRC connection reconfiguration message before performing the switching processing, the third communication channel being a channel to transmit data between the UE and the first UE without passing through the source base station, and wherein
   the switching processing performs switching to a fourth communication channel from the second communication channel, the fourth communication channel is a channel between the UE and a target base station.

2. The UE according to claim 1,
   wherein the control circuit is configured to control the communication circuit to establish the second communication channel between the UE and the source base station and switch from the wireless communication with the first UE via the first communication channel to the wireless communication via the second communication channel, in a case where a state where a quality of the first communication channel is poorer than a prescribed quality continues for a prescribed time or longer, during the wireless communication with the first UE via the first communication channel.

3. The UE according to claim 1,
   wherein the control circuit is configured to control the communication circuit to transmit a switching instruction to the first UE via the first communication channel, in a case where a quality of the first communication channel is poorer than a prescribed quality, and control the communication circuit to establish the second communication channel between the UE and the source base station and switch from the wireless communication with the first UE via the first communication channel to the wireless communication via the second communication channel, in a case where a response to the switching instruction is received, during the wireless communication with the first UE via the first communication channel.

4. The UE according to claim 3,
   wherein the control circuit is configured to control the communication circuit to establish the second communication channel between the UE and the source base station, and switch from the wireless communication with the first UE via the first communication channel to the wireless communication via the second communication channel, in a case where a state where the quality of the first communication channel is poorer than the prescribed quality continues for a prescribed time or longer, even in a case where the response to the switching instruction is not received.

5. The UE according to claim 1,
   wherein the control circuit is configured to control the communication circuit to transmit a result of measurement of a quality of the first communication channel to the source base station, in a case where the quality of the first communication channel is poorer than a prescribed quality, and control the communication circuit to establish the second communication channel between the UE and the source base station, and switch from the wireless communication with the first UE via the first communication channel to the wireless communication via the second communication channel, in a case where a switching instruction is received from the source base station, during the wireless communication with the first UE via the first communication channel.

6. The UE according to claim 5,
   wherein the control circuit is configured to control the communication circuit to establish the second communication channel between the UE and the source base station, and switch from the wireless communication with the first UE via the first communication channel to the wireless communication via the second communication channel, in a case where a state where the quality of the first communication channel is poorer than the prescribed quality continues for a prescribed time or longer, even in a case where the switching instruction is not received.

7. The UE according to claim 1, wherein the control circuit controls to perform the switching processing while maintaining an establishment of the first communication channel.

8. A source base station in a wireless communication system, the wireless communication system including the source base station and a plurality of second wireless communication apparatuses, the source base station comprising:
   a communication circuit configured to perform wireless communication via a second communication channel to transmit data between the source base station and any of the plurality of second wireless communication apparatuses without passing through the source base station, each of the plurality of second wireless communication apparatuses being capable of performing a wireless communication via a first communication channel between the each of the plurality of second wireless communication apparatuses and another of the plurality of second wireless communication apparatus; and a control circuit configured to control the communication circuit to transmit a signal of a radio resource control (RRC) layer to any of the plurality of second wireless communication apparatuses via the first communication channel, the signal of the RRC layer being configured to cause any of the plurality of second wireless communication apparatuses to execute first processing when the signal of the RRC layer is received by any of the plurality of second wireless communication apparatuses, the first processing including performing switching processing of the second communication channel and performing a wireless communication via the first communication channel by using a radio resource information included in a RRC connection reconfiguration message including a mobility control information, the RRC connection reconfiguration message being included in the signal of the RRC layer, wherein the first processing further includes establishing communication with the any of the plurality of second wireless communication apparatuses via a third communication channel using the radio resource information included in the RRC connection reconfiguration message before performing the switching processing, the third communication channel being a channel to transmit data between the source base station and any of the plurality of second wireless communication apparatuses without passing through the source base station, and wherein the switching processing performs switching to a fourth, communication channel from the second communication channel in any of the plurality of second wireless communication apparatuses, the fourth communication channel is a channel between any of the plurality of second wireless communication apparatuses and a target base station.

9. The source base station according to claim 8, wherein the plurality of second wireless communication apparatuses is a terminal or a mobile station.

10. A wireless communication system comprising:
a source base station and a plurality of second wireless communication apparatuses,
wherein each of the plurality of second wireless communication apparatuses includes:
  a first communication circuit configured to perform wireless communication via a first communication channel to transmit data between each of the plurality of second wireless communication apparatuses and another of the plurality of second wireless communication apparatuses without passing through the source base station and wireless communication via a second communication channel between the plurality of second wireless communication apparatuses and the source base station, and
  a first control circuit configured to execute first processing when a signal of a radio resource control (RRC) layer is received from the source base station, the first processing including controlling the first communication circuit to perform switching processing of the second communication channel, and controlling the first communication circuit to perform a wireless communication via the first communication channel by using a radio resource information included in a RRC connection reconfiguration message including a mobility control information, the RRC connection reconfiguration message being included in the received signal of the RRC layer, wherein the first processing further includes establishing communication with the another of the plurality of second wireless communication apparatuses via a third communication channel using the radio resource information included in the RRC connection reconfiguration message before performing the switching processing, the third communication channel being a channel to transmit data between each of the plurality of the second wireless communication apparatuses and another of the plurality of second wireless communication apparatuses without passing through the source base station, and wherein the switching processing performs switching to a fourth communication channel from the second communication channel, the fourth communication channel is a channel between any of the plurality of second wireless communication apparatuses and a target base station, and wherein the source base station includes:
  a second communication circuit configured to perform wireless communication via the second communication channel between the source base station and any of the plurality of second wireless communication apparatuses, each of the plurality of second wireless communication apparatuses being capable of performing a wireless communication with another of the plurality of second wireless communication apparatuses via the first communication channel, and
  a second control circuit configured to control the second communication circuit to transmit the signal of the RRC layer to any of the plurality of second wireless communication apparatuses via the first communication channel, the signal of the RRC layer being configured to cause any of the plurality of second wireless communication apparatuses to execute first processing when the signal of the RRC layer is received by any of the plurality of second wireless communication apparatuses, the first processing including performing switching processing of the second communication channel and performing a wireless communication via the first communication channel by using a radio resource information included in the RRC connection reconfiguration message including the mobility control information being included in the signal of the RRC layer.

11. The wireless communication system according to claim 10, wherein the plurality of second wireless communication apparatuses is a terminal or a mobile station.

12. A processing method implemented by a wireless communication apparatus, the processing method comprising:
performing wireless communication via a first communication channel to transmit data between the wireless communication apparatus and a first wireless communication apparatus without passing through a source base station or wireless communication via a second communication channel between the wireless communication apparatus and the source base station; and causing the wireless communication apparatus to execute first processing when a signal of a radio resource control (RRC) layer is received from the source base station, the first processing including performing switching processing of the second communication channel, and performing a wireless communication via the first communication channel by using a radio resource information included in a RRC connection reconfiguration message including a mobility control information, the RRC connection reconfiguration message being included in the received signal of the RRC layer, wherein the first processing further includes establishing communication with the first wireless communication apparatus via the a third communication channel using the radio resource information included in the RRC connection reconfiguration message before performing the switching processing, the third communication channel being a channel to transmit data between the wireless communication apparatus and the first wireless communication apparatus without passing through the source base station, and wherein the switching processing performs switching to a fourth communication channel from the second communication channel, the fourth communication channel is a channel between the wireless communication apparatus and a target base station.

13. The processing method according to claim 12, wherein the first wireless communication apparatus is a terminal or a mobile station.

14. A processing method implemented by a source base station, the processing method comprising:
causing the source base station, which is used in a wireless communication system that includes the source base station and a plurality of second wireless communication apparatuses, to perform wireless communication via a second communication channel between the source base station and any of the plurality of second wireless communication apparatuses, each of the plurality of second wireless communication apparatuses being capable of performing a wireless communication via a first communication channel to transmit data between the each of the plurality of second wireless communication apparatuses and another of the plurality of second wireless communication apparatuses without passing through a source base station, and
causing the source base station to transmit a signal of a radio resource control (RRC) layer to any of the plurality of second wireless communication apparatuses via the first communication channel, the signal of the RRC layer being configured to cause any of the plurality of second wireless communication apparatuses to execute first processing when the signal of the RRC layer is received by any of the plurality of second wireless communication apparatuses, the first processing including performing switching processing of the second communication channel and performing a wireless communication via the first communication channel by using a radio resource information included in a RRC connection reconfiguration message including a mobility control information, the RRC connection reconfiguration message being included in the signal of the RRC layer, wherein the first processing further includes establishing communication with the another of the plurality of a second wireless communication apparatuses via a third communication channel using the radio resource information included in the RRC connection reconfiguration message before performing the switching processing, the third communication channel being a channel to transmit data between the each of the plurality of second wireless communication apparatuses and another of the plurality of second wireless communication apparatuses without passing through the source base station, and wherein
the switching processing performs switching to a fourth communication channel from the second communication channel in any of the plurality of second wireless communication apparatuses, the fourth communication channel is a channel between any of the plurality of second wireless communication apparatuses and a target base station.

15. The processing method according to claim 14, wherein the plurality of second wireless communication apparatuses is a terminal or a mobile station.

* * * * *